(12) United States Patent
Kitazato

(10) Patent No.: US 10,194,211 B2
(45) Date of Patent: *Jan. 29, 2019

(54) RECEIVING DEVICE, RECEIVING METHOD, PROVIDING DEVICE, PROVIDING METHOD, PROGRAMS, AND BROADCASTING SYSTEM

(71) Applicant: Saturn Licensing LLC, New York, NY (US)

(72) Inventor: Naohisa Kitazato, Tokyo (JP)

(73) Assignee: Saturn Licensing LLC, New York, NY (US)

(*) Notice: Subject to any disclaimer, the term of this patent is extended or adjusted under 35 U.S.C. 154(b) by 156 days.

This patent is subject to a terminal disclaimer.

(21) Appl. No.: 14/626,216

(22) Filed: Feb. 19, 2015

(65) Prior Publication Data

US 2015/0163557 A1   Jun. 11, 2015

Related U.S. Application Data

(63) Continuation of application No. 13/976,257, filed as application No. PCT/JP2012/050835 on Jan. 17, 2012, now Pat. No. 8,966,564.

(30) Foreign Application Priority Data

Jan. 25, 2011 (JP) .................................. 2011-013265

(51) Int. Cl.
*H04N 7/173* (2011.01)
*H04N 21/6543* (2011.01)
(Continued)

(52) U.S. Cl.
CPC ....... *H04N 21/6543* (2013.01); *H04N 21/242* (2013.01); *H04N 21/4104* (2013.01);
(Continued)

(58) Field of Classification Search
CPC ............. H04N 21/6543; H04N 21/242; H04N 21/4104; H04N 21/462; H04N 21/435; H04N 21/45; H04N 21/235
See application file for complete search history.

(56) References Cited

U.S. PATENT DOCUMENTS

2003/0018967 A1    1/2003  Gorbatov et al.
2003/0227645 A1*  12/2003  Hisatomi et al. ............ 358/1.13
(Continued)

FOREIGN PATENT DOCUMENTS

EP    1 276 318 A1    1/2003
JP    11-163810 A     6/1999
(Continued)

OTHER PUBLICATIONS

Extended European Search Report dated Mar. 26, 2015 in Patent Application No. 12739081.3.
(Continued)

*Primary Examiner* — James R Marandi
(74) *Attorney, Agent, or Firm* — Oblon, McClelland, Maier & Neustadt, L.L.P.

(57) ABSTRACT

This technique relates to a receiving device, a receiving method, a providing device, a providing method, programs, and a broadcasting system that can control operations of external devices connected to the receiving device in synchronization with progress of a show being received.
When the application control type in an application control descriptor is 2, the receiving device receives command information contained in a digital broadcast signal, and acquires and starts a new information service application and the like in accordance with the received command information. When an external device is designated as the command destination device, the receiving device generates a command for the external device, and outputs the command to the external device. In accordance with the com-
(Continued)

mand from the receiving device, the external device acquires and starts the new information service application and the like. This disclosure can be applied not only to controlling the receiving device from the broadcasting side, but also to controlling external devices connected to the receiving device.

17 Claims, 35 Drawing Sheets

(51) Int. Cl.
*H04N 21/242* (2011.01)
*H04N 21/41* (2011.01)
H04N 21/43 (2011.01)
H04N 21/6547 (2011.01)
H04N 21/81 (2011.01)

(52) U.S. Cl.
CPC ......... *H04N 21/4126* (2013.01); *H04N 21/43* (2013.01); *H04N 21/6547* (2013.01); *H04N 21/81* (2013.01)

(56) References Cited

U.S. PATENT DOCUMENTS

| | | |
|---|---|---|
| 2004/0045038 A1 | 3/2004 | Duff et al. |
| 2004/0107449 A1* | 6/2004 | Fukuda et al. ............... 725/135 |
| 2005/0110909 A1 | 5/2005 | Staunton et al. |
| 2006/0064734 A1 | 3/2006 | Ma |
| 2006/0168635 A1 | 7/2006 | Terashima et al. |
| 2008/0284907 A1 | 11/2008 | Chiao |
| 2010/0180296 A1* | 7/2010 | Hendricks ............. H04H 20/10 725/34 |

FOREIGN PATENT DOCUMENTS

| | | |
|---|---|---|
| JP | 2001-333030 A | 11/2001 |
| JP | 2004-312191 A | 11/2004 |
| JP | 2006-197358 A | 7/2006 |
| WO | WO 2004/051909 A2 | 6/2004 |

OTHER PUBLICATIONS

Combined Chinese Office Action and Search Report dated Oct. 8, 2015 in Patent Application No. 201280006092.3 (with English language translation).

* cited by examiner

FIG. 8

APPLICATION CONTROL DESCRIPTOR

```
Application_control_descriptor () {
    descriptor_tag                                      8
    descriptor_length                                   8
    application_control_type                            3
    reserved                                            5
    if(application_control_type==1) {
        destination_device_type                         8
        application_id                                  16
        app_url_length                                  8
        for(i=0; i<N; i++) {
            app_url_byte                                8×N
        }
        app_type                                        4
        app_life_scope                                  2
        reserved                                        2
        app_expire_date                                 32
    }
    if(application_control_type==3) {
        app_control_data_url_length                     8
        for(i=0; i<N; i++) {
            app_control_data_url_byte                   8×N
        }
    }
}
```

FIG. 9

| INFORMATION ITEM | COMMAND INFORMATION |
| --- | --- |
| | CONTENT |
| COMMAND ID | ID FOR IDENTIFYING COMMAND INFORMATION |
| COMMAND DESTINATION DEVICE TYPE | INDICATING DEVICE TO EXECUTE COMMAND. "RECEIVING DEVICE","EXTERNAL DEVICE TYPE 1", "EXTERNAL DEVICE TYPE 2"... |
| COMMAND CODE | INDICATING COMMAND TYPE. 5 TYPES: ACQUIREMENT, START, END, EVENT, SUSPENSION |
| COMMAND VALIDITY PROBABILITY PARAMETER | INDICATING PROBABILITY OF DETERMINING COMMAND TO BE VALID IN DEVICE TO EXECUTE COMMAND. AIMING TO DISPERSE ACCESS TO SERVER. |
| APPLICATION ID | TARGET APPLICATION ID |
| APPLICATION TYPE | APPLICATION TYPE |
| PROVIDER ID | ID INDICATING PROVIDER |
| APPLICATION URL | APPLICATION DESTINATION URL IN NETWORK |
| APPLICATION EXPIRATION DATE | EXPIRATION DATA ON WHICH APPLICATION IS ERASED |
| APPLICATION VALID RANGE | RANGE IN WHICH EXECUTION OF APPLICATION CONTINUES. RANGE TO BE USED AT THE TIME OF REUSE. "SPECIFIC SERVICE", "SPECIFIC PROVIDER" "NO DESIGNATED RANGE" |
| EVENT ID | EVENT ID IN THE CASE OF "EVENT" |
| EVENT ADDED DATA | DATA TO BE INTRODUCED INTO APPLICATION AT THE TIME OF FIRING EVENT IN THE CASE OF "EVENT" |

FIG. 10

COMMAND INFORMATION syntax

| Syntax | No. Bits | Format |
|---|---|---|
| Command_for_related_application() { | | |
|   command_id | 8 | uimsbf |
|   protocol_version | 8 | uimsbf |
|   provider_id | 8 | uimsbf" |
|   command_destination_device_type | 8 | uimsbf |
|   command_code | 8 | uimsbf |
|   command_validity | 8 | uimsbf |
|   application_id | 16 | uimsbf |
|   app_url_length | 8 | uimsbf |
|   for(i=0; i<N; i++) { | | |
|     app_url_byte | 8 | bslbsf |
|   } | | |
|   if(command_code==1 \|\| command_code==2) { | | (register/execute) |
|     app_type | 4 | uimsbf |
|     app_life_scope | 2 | uimsbf |
|     reserved | 2 | |
|     app_expire_date | 32 | uimsbf |
|   } | | |
|   if(command_code==3) { | | (Inject event) |
|     event_id | 16 | uimsbf |
|     event_embedded_data_length | 8 | uimsbf |
|     for(i=0; i<N; i++) { | | |
|       event_embedded_data_byte | 8×N | bslbf |
|     } | | |
|   } | | |
| } | | |

FIG. 11

```
video_sequence video_sequence() {
    next_start_code()
    sequence_header()
    if(nextbits()==extension_start_code) {
        sequence_extension()
        do{
            extension_and_user_data(0)
            do{
                if(nextbits()==group_start_code) {
                    group_of_pictures_header()
                    extension_and_user_data(1)
                }
                picture_header()
                picture_coding_extension()
                extensions_and_user_data(2)
                picture_data()
            }while((nextbits()==picture_start_code) ||
                (nextbits()==group_start_code))
            if(nextbits()!=sequence_end_code) {
                sequence_header()
                sequence_extension()
            }
        }while(nextbits()!=sequence_end_code)
    }else{
        /* ISO/IEC 11172-2 */
    }
    sequence_end_code
}
```

FIG. 12 user_data

| DATA STRUCTURE | NUMBER OF BITS | BIT STRING NOTATION |
|---|---|---|
| user_data() {<br>  user_data_start_code<br>  Commands_for_related_application_identifier<br>  while(nextbits() != '0000 0000 0000 0000 0000 0000 0000 0001') {<br>    Commands_for_related_application()<br>  }<br>  next_start_code()<br>} | 32<br>32 | uimsbf<br>uimsbf |

FIG. 15

DATA STRUCTURE OF SEGMENT DATA SEQUENCE

| ELEMENT (ATTRIBUTE) | | | | | NUMBER OF APPEARANCES | VALUE | DEFINITION AND SPECIFIC USE |
|---|---|---|---|---|---|---|---|
| segment_sequence | | | | | 1 | | |
| | segment | | | | 1..N | | DATA SEGMENT |
| | | @segment_number | | | 1 | | SEGMENT NUMBER |
| | | start_PTS | | | 1 | | SEGMENT START PTS VALUE |
| | | End_PTS | | | 1 | | SEGMENT END PTS VALUE |
| | | command | | | 0..1 | | APPLICATION COMMAND |
| | | meta | | | 0..1 | | METADATA |

FIG. 16

DATA STRUCTURE OF COMMAND DATA

| ELEMENT (ATTRIBUTE) | | NUMBER OF APPEARANCES | DEFINITION AND SPECIFIC USE |
|---|---|---|---|
| command | | 1 | |
| | @destination | 1 | COMMAND DESTINATION DEVICE<br>"receiver": RECEIVER<br>"external_1" EXTERNAL DEVICE TYPE 1<br>"external_2" EXTERNAL DEVICE TYPE 2 |
| | @action | 1 | COMMAND TYPE<br>"execute" APPLICATION EXECUTION<br>"register" APPLICATION ACQUIREMENT (REGISTRATION)<br>"suspend" APPLICATION SUSPENSION<br>"terminate" APPLICATION END<br>"event" EVENT FIRING |
| diffusion | | 0..1 | DISPERSE TIME TO APPLY COMMAND |
| | @rate | 1 | NUMBER OF DIVISIONS |
| | @range | 1 | MAXIMUM DELAY TIME |
| | @period | 1 | COMMAND DESTINATION DISPERSING PERIOD |

FIG. 17

DATA STRUCTURE OF COMMAND

| ELEMENT (ATTRIBUTE) | | | NUMBER OF APPEARANCES | DEFINITION AND SPECIFIC USE |
|---|---|---|---|---|
| application | | | 1 | DESCRIPTION OF TARGET APPLICATION |
| | @id | | 1 | APPLICATION ID |
| | @url | | 0..1 | APPLICATION ACQUIREMENT DESTINATION URL REQUIRED FOR "execute" AND "register" |
| | @expire_date | | 0..1 | APPLICATION EXPIRATION DATE REQUIRED FOR "execute" AND "register" |
| | @scope | | 0..1 | APPLICATION VALID RANGE REQUIRED FOR "execute" AND "register" |
| event | | | 0..1 | APPLICATION EVENT REQUIRED FOR "event" |
| | @id | | 1 | EVENT ID |
| | related_data | | 0..1 | DATA TO BE INPUT TO APPLICATION IN REGARD TO EVENT |

FIG. 18

DATA STRUCTURE OF METADATA

| ELEMENT (ATTRIBUTE) | | NUMBER OF APPEARANCES | DEFINITION AND SPECIFIC USE |
|---|---|---|---|
| meta | | 1 | |
| | @type | 1 | METADATA TYPE "application_data" APPLICATION DATA "caption" TEXT SUBTITLES DATA "subtitle" BITMAP SUBTITLES DATA etc |
| | @target | 0..1 | TARGET APPLICATION DESIGNATED WITH TARGET APPLICATION ID. NOT PROVIDED WHEN Resident APPLICATION IS TARGET. |
| ##defined structure | | | DATA STRUCTURE OF EACH Type |

FIG. 19

STRUCTURE OF BITMAP SUBTITLES DATA

| ELEMENT (ATTRIBUTE) | | NUMBER OF APPEARANCES | DEFINITION AND SPECIFIC USE |
|---|---|---|---|
| subtitle | | 0..N | |
| | @id | 1 | SUBTITLES SEQUENCE NUMBER |
| | @left | 0..1 | LEFT END OF SUBTITLES DISPLAY AREA |
| | @upper | 0..1 | UPPER END OF SUBTITLES DISPLAY AREA |
| | @right | 0..1 | RIGHT END OF SUBTITLES DISPLAY AREA |
| | @lower | 0..1 | LOWER END OF SUBTITLES DISPLAY AREA |
| | bitmap | 1 | BITMAP DATA (Base64) |

FIG. 20

STRUCTURE OF TEXT SUBTITLES DATA

| ELEMENT (ATTRIBUTE) | | NUMBER OF APPEARANCES | DEFINITION AND SPECIFIC USE |
|---|---|---|---|
| caption | | 0..1 | |
| | @id | 1 | SUBTITLES SEQUENCE NUMBER |
| | @color | 0..1 | SUBTITLES COLOR DESIGNATION |
| | @region_left | 0..1 | HORIZONTAL START POSITION OF SUBTITLES DISPLAY |
| | @region_upper | 0..1 | VERTICAL START POSITION OF SUBTITLES DISPLAY |
| | @size | 0..1 | CHARACTER SIZE |
| | @font | 0..1 | CHARACTER FONT |
| | text | 1 | CHARACTER STRING |

FIG. 21

SEGMENT SEQUENCE

```
<segment_sequence>
  <segment segment_number="1">
    <start_PTS> 12000 </start_PTS>
    <end_PTS> 15000 </end_PTS>
    <command destination="receiver" action="execute">
      <application id="1" url="xxx.com/yyy" expire_date="2011-01-21">
    </command>
  </segment>
  <segment segment_number="2">
    <start_PTS> 13000 </start_PTS>
    <end_PTS> 13100 </end_PTS>
    <command destination="receiver" action="event">
      <application id="1">
      <event id="event1">
    </command>
  </segment>
  <segment segment_number="3">
    <start_PTS> 12000 </start_PTS>
    <end_PTS> 20000 </end_PTS>
    <meta type="application_data" target="1">
      Meta Description
    </meta>
  </segment>
</segment_sequence>
```

FIG. 22

```
<segment_sequence>

<segment segment_number=10>
    <start_PTS> 10000 </start_PTS>
    <end_PTS> 12000 </end_PTS>
    <meta type="subtitle">
        <subtitle id="1" left="200" upper="100" right="1400",
         lower="300">
         3847efevd48vdfk6・・・・・・(IMAGE PNG DATA)
        </subtitle>
    </meta>

</segment_Sequence>
```

FIG. 24

```
<segment_sequence>

<segment segment_number=10>
<start_PTS> 10000 </start_PTS>
<end_PTS> 12000 </end_PTS>
<meta type="caption">
    <subtitle id="1" left="200" upper="100" size="20"
     color="red">
    THIS IS A TEXT CAPTION
    </subtitle>
</meta>

</segment_Sequence>
```

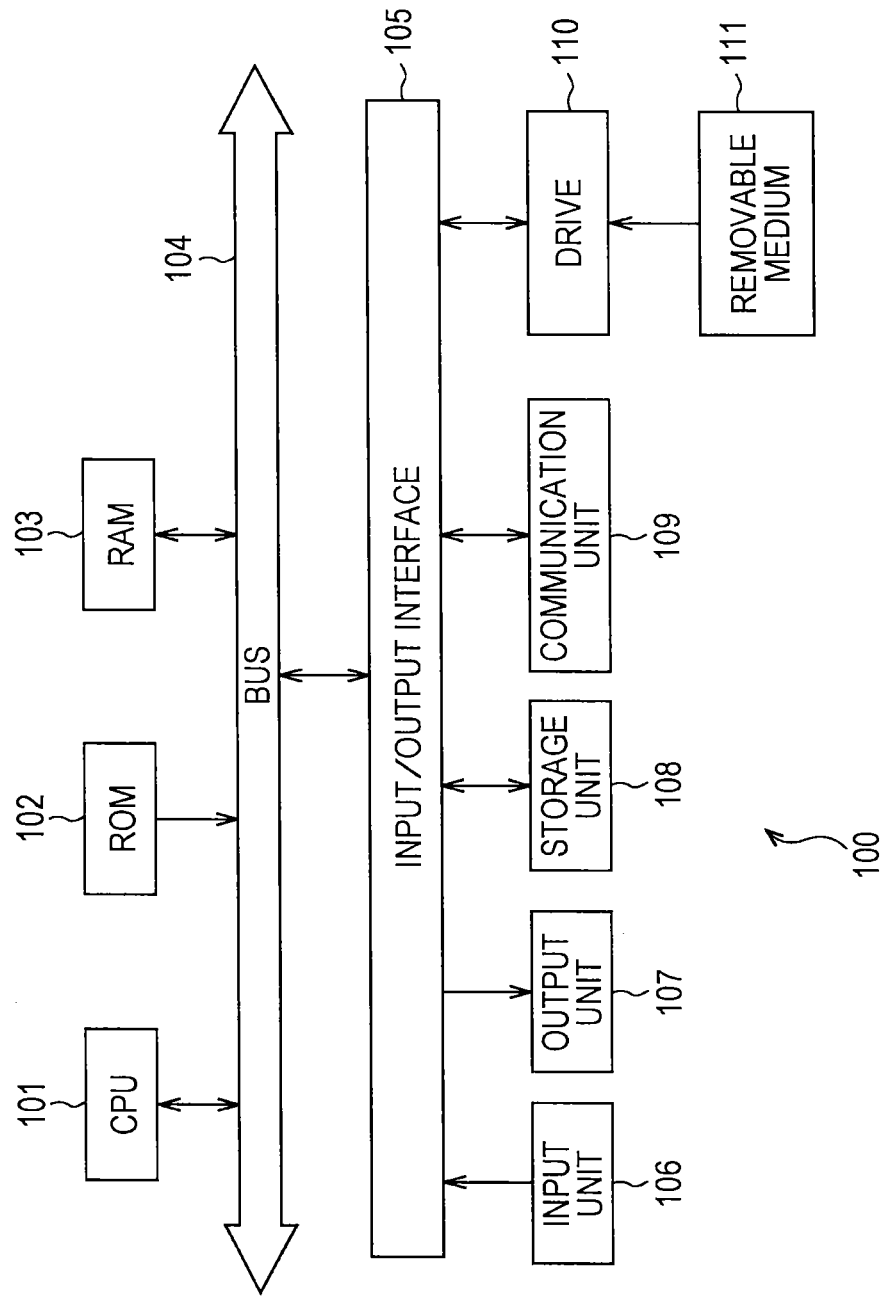

RECEIVING DEVICE, RECEIVING METHOD, PROVIDING DEVICE, PROVIDING METHOD, PROGRAMS, AND BROADCASTING SYSTEM

CROSS-REFERENCE TO RELATED APPLICATIONS

This application is a continuation of U.S. application Ser. No. 13/976,257 filed Jun. 26, 2013, the entire content of which is incorporated herein by reference. U.S. application Ser. No. 13/976,257 is a National Stage of PCT/JP2012/050835 filed Jan. 17, 2012, which claims priority under 35 U.S.C. 119 to Japanese Application No. 2011-013265 filed Jan. 25, 2011.

TECHNICAL FIELD

This disclosure relates to receiving devices, receiving methods, providing devices, providing methods, programs, and broadcasting systems, and more particularly, to a receiving device, a receiving method, a providing device, a providing method, programs, and a broadcasting system that are designed to control operations for a predetermined application program in synchronization with progress of a digital television broadcast show.

BACKGROUND ART

In digital television broadcasting, not only television show broadcasting services but also so-called data broadcasting services have already been realized (see Patent Document 1, for example). Future introduction of more sophisticated services into digital television broadcasting by taking advantage of the Internet is now being considered.

When more sophisticated services are introduced into digital television broadcasting by taking advantage of the Internet, there will be a need to make measured modifications to the existing broadcast system for digital television broadcasting, so as to secure operations of receiving devices such as the existing digital television receivers, and take the limited broadcast band into consideration.

CITATION LIST

Patent Document

Patent Document 1: Japanese Patent Application Laid-Open No. 2006-50237

SUMMARY OF THE INVENTION

Problems to be Solved by the Invention

As the more sophisticated services that incorporate the Internet into digital television broadcasting, the following services are being considered, for example. An application program that acts in synchronization with progress of a show is supplied to a receiving device via the Internet so as to control operations of the receiving device, and external devices connected to the receiving device are made to operate in synchronization with progress of the show.

As present, however, any technique has not been developed for controlling operations of external devices connected to a receiving device in synchronization with progress of a show being received.

This disclosure is made in view of such circumstances, and aims to control operations of external devices connected to a receiving device in synchronization with progress of a program being received.

Solutions to Problems

A receiving device as a first aspect of this disclosure is a receiving device that receives content broadcast via a broadcasting network, and includes: a receiving unit that receives a broadcast signal broadcast via the broadcasting network; a command information acquiring unit that acquires, from the received broadcast signal, command information containing command destination device information designating at least one of a receiving device main unit and an external device that can be connected to the receiving device, and a command related to a predetermined application program executed in synchronization with progress of the content; a command information analyzing unit that performs an operation related to the predetermined application program in accordance with the command information; and an external device control unit that causes the external device to perform an operation related to the predetermined application program in accordance with the command information.

The command destination device information may designate at least one of the receiving device main unit and external devices of different types that can be connected to the receiving device.

When the command destination device information designates the receiving device main unit, the command information analyzing unit may perform an operation related to the predetermined application program in accordance with the command. When the command destination device information designates the external device, the external device control unit may generate an external device command for causing the designated external device to perform an operation related to the predetermined application program.

The receiving device as the first aspect of this disclosure may further include an application control descriptor acquiring unit that acquires, from the received broadcast signal, an application control descriptor in which an application control type is written. The command information acquiring unit may acquire the command information from the broadcast signal, in accordance with the application control type in the acquired application control descriptor.

The receiving device as the first aspect of this disclosure may further include an application control descriptor analyzing unit that performs an operation related to the predetermined application program in accordance with the application control descriptor when the command information is not acquired from the broadcast signal in accordance with the application control type in the acquired application control descriptor.

The command information may contain a command for acquiring, starting, suspending, or ending the predetermined application program, or causing the predetermined application program to fire an event.

A receiving method as the first aspect of this disclosure is a receiving method for a receiving device that receives content broadcast via a broadcasting network. The receiving method includes: a receiving step of receiving a broadcast signal broadcast via the broadcasting network; a command information acquiring step of acquiring, from the received broadcast signal, command information containing command destination device information designating at least one of a receiving device main unit and an external device that can be connected to the receiving device, and a command related to a predetermined application program executed in synchronization with progress of the content; a command information analyzing step of performing an operation related to the predetermined application program in accordance with the command information; and an external device control step of causing the external device to perform an operation related to the predetermined application program in accordance with the command information, the steps being carried out by the receiving device.

A program as the first aspect of this disclosure is designed for a computer that receives content broadcast via a broadcasting network. The program causes the computer to function as: a receiving unit that receives a broadcast signal broadcast via the broadcasting network; a command information acquiring unit that acquires, from the received broadcast signal, command information containing command destination device information designating at least one of a receiving device main unit and an external device that can be connected to the receiving device, and a command related to a predetermined application program executed in synchronization with progress of the content; a command information analyzing unit that performs an operation related to the predetermined application program in accordance with the command information; and an external device control unit that causes the external device to perform an operation related to the predetermined application program in accordance with the command information.

In the first aspect of this disclosure, a broadcast signal broadcast via a broadcasting network is received, and command information containing command destination device information designating at least one of a receiving device main unit and an external device that can be connected to a receiving device, and a command related to a predetermined application program executed in synchronization with progress of content is acquired from the received broadcast signal. An operation related to the predetermined application program is performed in accordance with the command information, and the external device is made to perform an operation related to the predetermined application program in accordance with the command information.

A providing device as a second aspect of this disclosure is a providing device that provides content to a receiving device via a broadcasting network, and includes a broadcasting unit that broadcasts a broadcast signal via the broadcasting network, the broadcast signal containing command information and the content, the command information containing command destination device information designating at least one of a receiving device main unit and an external device that can be connected to the receiving device, and a command related to a predetermined application program executed in synchronization with progress of the content.

The command destination device information may designate at least one of the receiving device main unit and external devices of different types that can be connected to the receiving device.

The broadcasting unit may broadcast the broadcast signal further containing an application control descriptor via the broadcasting network, an application control type being written in the application control descriptor. The receiving device acquires the command information from the broadcast signal, in accordance with the application control type in the received application control descriptor.

The command information may contain a command for acquiring, starting, suspending, or ending the predetermined application program, or causing the predetermined application program to fire an event.

A providing method as the second aspect of this disclosure is a providing method for a providing device that provides content to a receiving device via a broadcasting network. The providing method includes a broadcasting step of broadcasting a broadcast signal via the broadcasting network, the broadcast signal containing command information and the content, the command information containing command destination device information designating at least one of a receiving device main unit and an external device that can be connected to the receiving device, and a command related to a predetermined application program executed in synchronization with progress of the content, the step being carried out by the providing device.

A program as the second aspect of this disclosure is designed for a computer that provides content to a receiving device via a broadcasting network. The program causes the computer to function as a broadcasting unit that broadcasts a broadcast signal via the broadcasting network, the broadcast signal containing command information and the content, the command information containing command destination device information designating at least one of a receiving device main unit and an external device that can be connected to the receiving device, and a command related to a predetermined application program executed in synchronization with progress of the content.

In the second aspect of this disclosure, a broadcast signal containing command information and content is broadcast via a broadcasting network, the command information containing command destination device information designating at least one of a receiving device main unit and an external device that can be connected to a receiving device, and a command related to a predetermined application program executed in synchronization with progress of the content.

A program as a third aspect of this disclosure is designed for a broadcasting system that provides content from a providing device to a receiving device via a broadcasting network. In the broadcasting system, the providing device includes a broadcasting unit that broadcasts a broadcast signal via the broadcasting network, the broadcast signal containing command information and the content, the command information containing command destination device information designating at least one of a receiving device main unit and an external device that can be connected to the receiving device, and a command related to a predetermined application program executed in synchronization with progress of the content. The receiving device includes: a receiving unit that receives the broadcast signal broadcast via the broadcasting network; a command information acquiring unit that acquires the command information from the received broadcast signal; a command information analyzing unit that performs an operation related to the predetermined application program in accordance with the command information; and an external device control unit that causes the external device to perform an operation related to the predetermined application program in accordance with the command information.

In the third aspect of this disclosure, the providing device broadcasts a broadcast signal containing command information and content via a broadcasting network, the command information containing command destination device information designating at least one of a receiving device main unit and an external device that can be connected to the receiving device, and a command related to a predetermined application program executed in synchronization with progress of the content. Also, the receiving device receives the broadcast signal broadcast via the broadcasting network, acquires the command information from the received broadcast signal, performs an operation related to the predetermined application program in accordance with the command information, and causes the external device to perform an operation related to the predetermined application program in accordance with the command information.

Effects of the Invention

According to the first aspect of this disclosure, operations of a connected external device can be controlled in synchronization with progress of content.

According to the second aspect of this disclosure, an external device connected to a receiving device can be controlled to operate in synchronization with progress of content.

According to the third aspect of this disclosure, an external device connected to a receiving device can be controlled to operate in synchronization with progress of content.

BRIEF DESCRIPTION OF DRAWINGS

FIG. 8 is a diagram showing an example syntax of an application control descriptor.

FIG. 9 is a diagram showing information items in command information.

FIG. 10 shows an example syntax of command information.

FIG. 11 is a diagram showing the sequence in command information in a video stream.

FIG. 12 is a diagram showing the sequence in command information in a video stream.

FIG. 15 is a diagram showing the data structure of a segment data sequence.

FIG. 16 is a diagram showing the structure of command data in segment data.

FIG. 17 is a diagram showing the structure of command data in segment data.

FIG. 18 is a diagram showing the structure of metadata in segment data.

FIG. 19 is a diagram showing the structure of bitmap subtitles data in the metadata.

FIG. 20 is a diagram showing the structure of text subtitles data in the metadata.

FIG. 21 is a diagram showing an example syntax of a segment data sequence.

FIG. 22 is a diagram showing an example syntax in a case where the metadata type of segment data is bitmap subtitles data.

FIG. 24 is a diagram showing an example syntax in a case where the metadata type of segment data is text subtitles data.

FIG. 35 is a block diagram showing an example structure of a computer.

MODES FOR CARRYING OUT THE INVENTION

The following is a detailed description of best modes for carrying out this disclosure (hereinafter referred to as embodiments), with reference to the drawings.

<1. Embodiments>

[Example Structure of a Broadcasting System]

Figure 1:
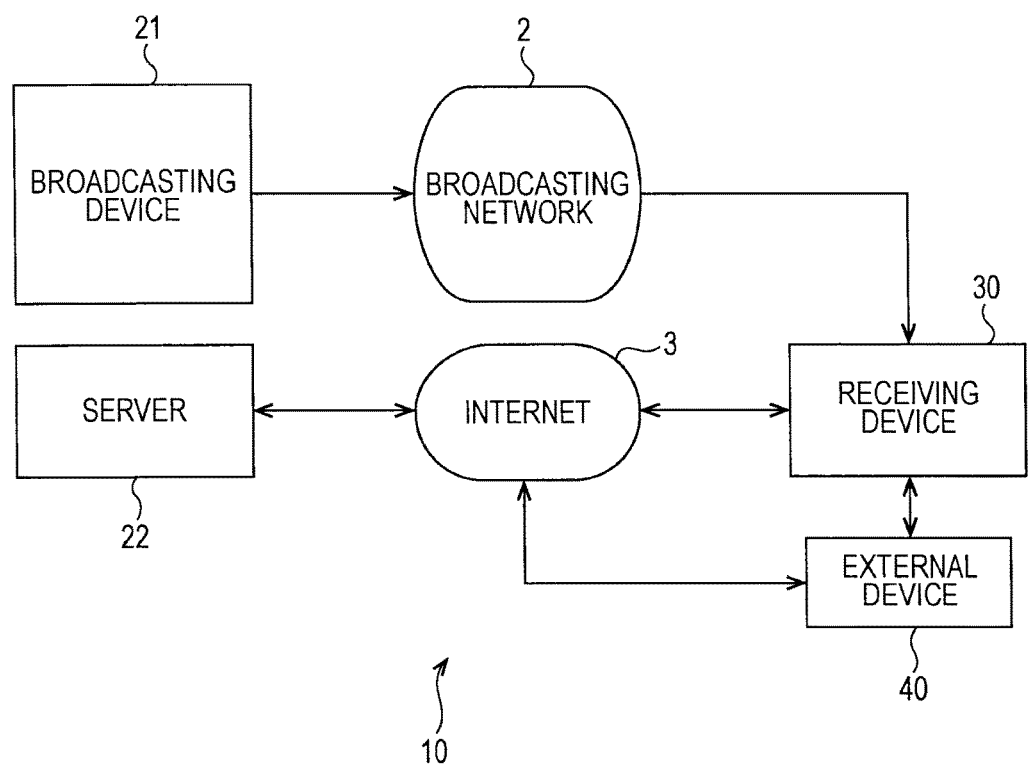
FIG. 1 is a block diagram showing an example structure of a broadcasting system of this disclosure.

FIG. 1 shows a broadcasting system that is an embodiment. This broadcasting system 10 includes a broadcasting device 21 and a server 22 that are provided on the broadcasting side, and a receiving device 30 and an external device 40 that are provided on the receiving side.

This broadcasting system 10 realizes not only a programmed broadcasting service and a data broadcasting service like conventional television broadcasting services, but also novel services such as updating and displaying the information related to a currently received show or commercial in synchronization with the show or commercial (hereinafter referred to as the new information services). The new information services are realized by the receiving device 30 or the external device 40 executing an application program supplied from the server 22.

The broadcasting device 21 broadcasts a digital broadcast signal via a broadcasting network 2 such as a terrestrial digital broadcasting network, a satellite broadcasting network, or a cable television network. This digital broadcast signal contains signals of video images, voices, and subtitles of programmed shows, and signals for the data broadcasting service. Further, the digital broadcast signal contains an application control descriptor for controlling the receiving device 30 and command information in a predetermined position. The same application control descriptor and the same command information are repeatedly broadcast over a predetermined period of time.

When the new information services are conducted on a service basis (or a so-called channel basis), the application control descriptor is contained in an SDT (service description table) in the digital broadcast signal, and is then broadcast. When the new information services are conducted on a programmed show basis, the application control descriptor is contained in an EIT (event information table) in the digital broadcast signal, and is then broadcast. Alternatively, the application control descriptor may be contained in a PMT (program map table) of each show, and then be broadcast.

The command information is written in a predetermined position in the video stream of a show, or is encoded and embedded in the video image of the show, and is repeatedly broadcast over a predetermined period of time.

The application control descriptor and the command information will be described later in detail.

In response to a request from the receiving device 30, the server 22 supplies an application program (hereinafter referred to simply as the new information service application) for realizing the new information services in the receiving device 30, to the receiving device 30 via the Internet 3. In response to a request from the external device 40, the server 22 also supplies the new information service application for realizing the new information services in the external device 40, to the external device 40 via the Internet 3.

Further, in response to a request from the receiving device 30, the server 22 supplies application control data necessary for controlling operations to acquire the new information service application, start the application, cause the application to fire an event, suspend the application, or end the application in the receiving device 30, to the receiving device 30 via the Internet 3.

The receiving device 30 receives the digital broadcast signal that is broadcast from the broadcasting device 21 via the broadcasting network 2, and, based on the received digital broadcast signal, outputs the video images and voices of shows and commercials. The receiving device 30 also combines the video images of the new information services with the video images of the shows and commercials, and displays the combined video images, by executing the new information service application acquired from the server 22. The receiving device 30 can connect to the external device 40 via a predetermined interface. The receiving device 30 can identify the type (described later) of the connected external device 40. The connection between the receiving device 30 and the external device 40 may be a wireless connection using a wireless LAN, Bluetooth (a registered trademark), infrared rays, or the like, or may be a wired connection via a cable LAN, a USB, a HDMI, or the like.

The receiving device 30 may be formed as an independent device, or may be installed in a digital television receiver or a video recorder, for example.

In accordance with a command from the receiving device 30, the external device 40 provides the new information services to a user by performing operations such as acquiring the new information service application from the server 22 and starting the new information service application. The external device 40 may be a smartphone, a personal digital assistant, a digital television receiver, or a video recorder, for example. A smartphone or a personal digital assistant as the external device 40 using Android (a trademark) as its platform is classified as external device type-1, and a smartphone or a personal digital assistant using iOS (a trademark) can be classified as external device type-2.

Figure 2:
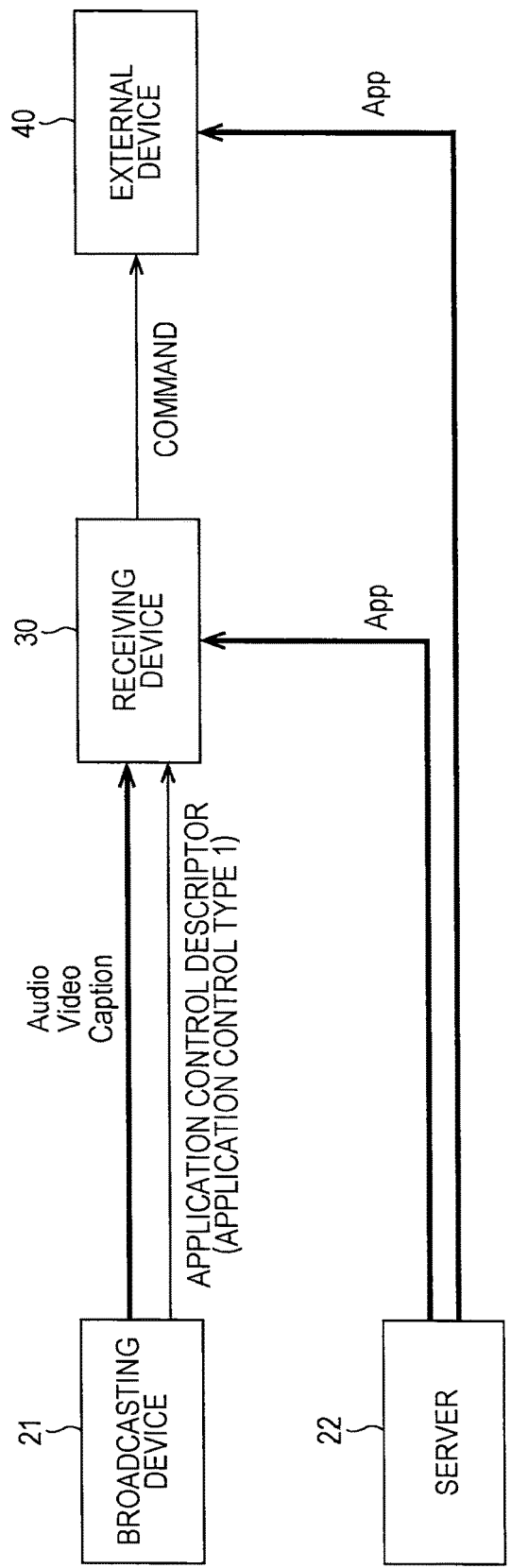
FIG. 2 is a diagram schematically showing the flow of information when the application control type is 1.
Figure 3:
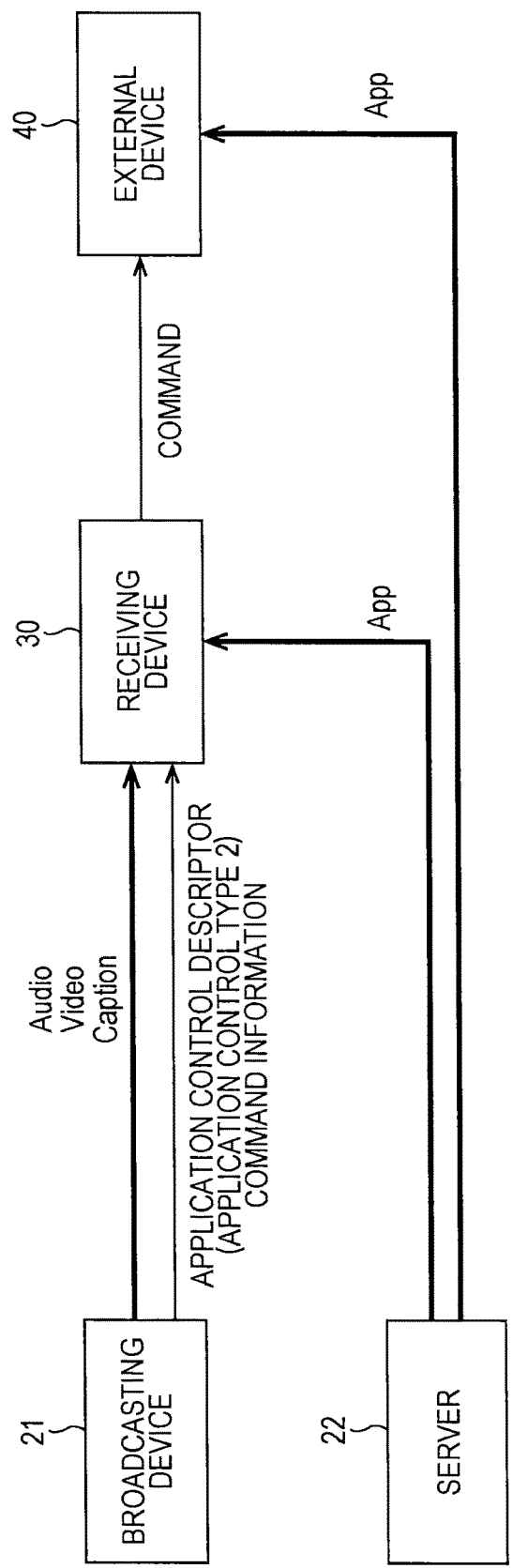
FIG. 3 is a diagram schematically showing the flow of information when the application control type is 2.
Figure 4:
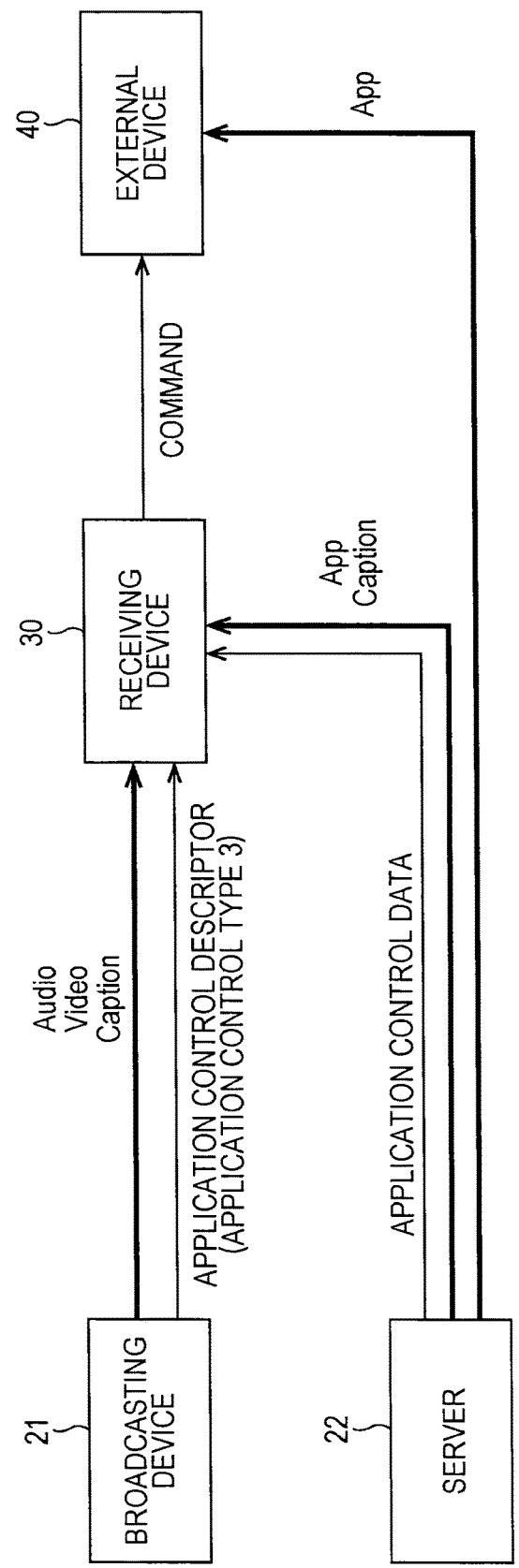
FIG. 4 is a diagram schematically showing the flow of information when the application control type is 3.

FIGS. 2 through 4 schematically show an information flow in the broadcasting system 10.

FIG. 2 illustrates a case where the application control type ("application_control_type" in FIG. 8) written in the application control descriptor is 1.

In this case, the receiving device 30 acquires the new information service application (App) from the server 22, based on the application control descriptor contained in the digital broadcast signal. In accordance with the command generated in the receiving device 30 based on the application control descriptor, the external device 40 acquires the new information service application from the server 22.

In this case, there is no need to detect the command information from the digital broadcast signal or acquire the application control data from the server 22 as in the later described cases where the application control type is 2 or 3. Accordingly, the processing load on the receiving device 30 can be reduced.

FIG. 3 illustrates a case where the application control type written in the application control descriptor is 2.

In this case, the receiving device 30 acquires the new information service application from the server 22, based on the command information contained in the digital broadcast signal. In accordance with the command that is generated in the receiving device 30 based on the command information and is supplied from the receiving device 30, the external device 40 acquires the new information service application from the server 22.

FIG. 4 illustrates a case where the application control type written in the application control descriptor is 3.

In this case, the receiving device 30 acquires the application control data from the server 22, based on the application control descriptor contained in the digital broadcast signal. Further, the receiving device 30 acquires the new information service application from the server 22, based on the application control data. The application control data acquired from the server 22 can contain metadata (such as subtitles data corresponding to shows), as well as the command related to operations such as acquiring and starting the new information service application. In accordance with the command generated in the receiving device 30 based on the application control data, the external device 40 acquires the new information service application from the server 22.

In this case, the application control data for controlling the timing to execute the new information service application can be supplied to the receiving device 30 through a different passage from the digital broadcast signal.

[Example Structure of the Receiving Device 30]

Figure 5:
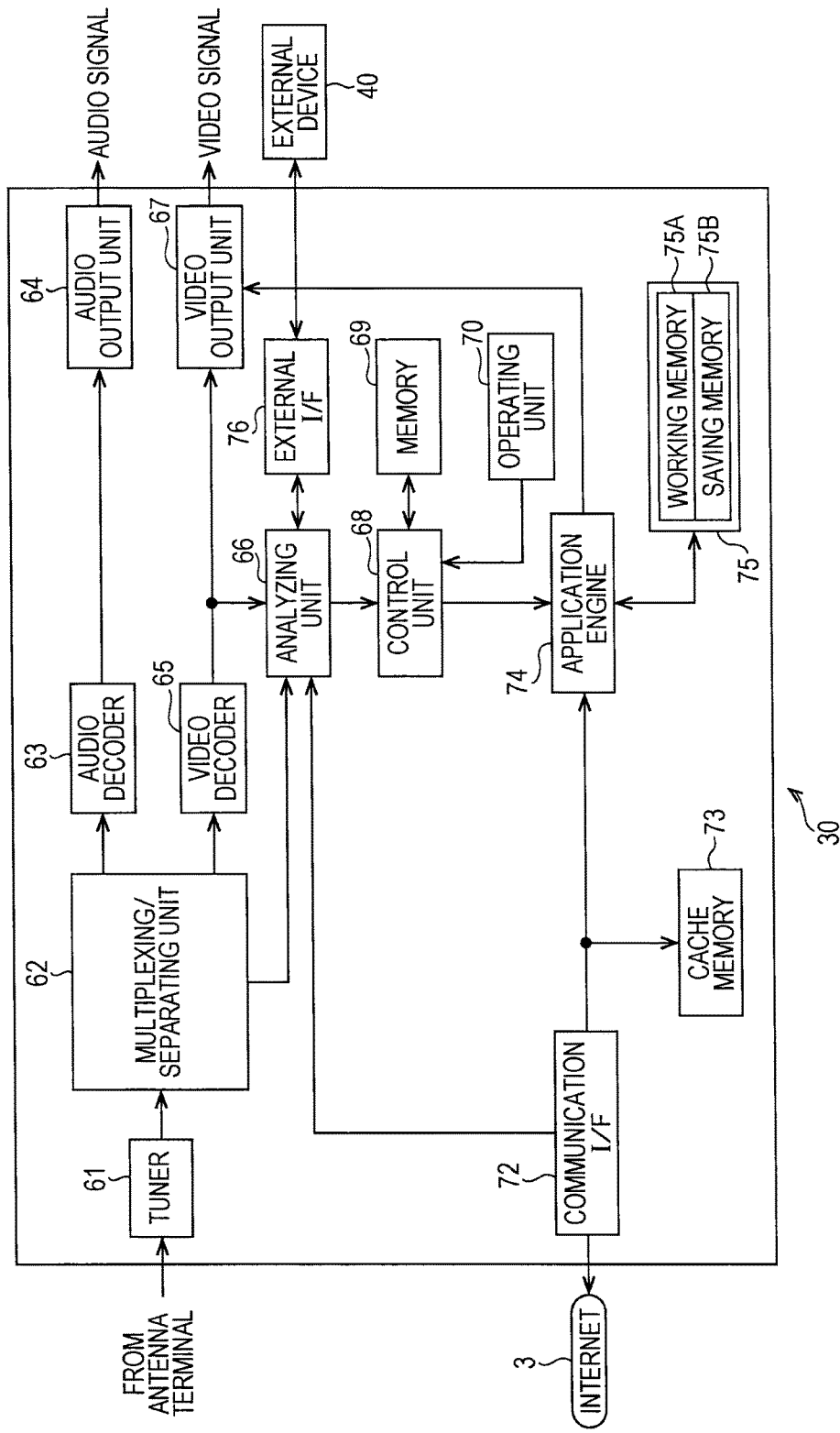
FIG. 5 is a block diagram showing an example structure of a receiving device.

FIG. 5 shows an example structure of the receiving device 30. The receiving device 30 includes a tuner 61, a multiplexing/separating unit 62, au audio decoder 63, an audio output unit 64, a video decoder 65, an analyzing unit 66, a video output unit 67, a control unit 68, a memory 69, an operating unit 70, a communication I/F 72, a cache memory 73, an application engine 74, an application memory 75, and an external I/F 76.

The tuner 61 receives and demodulates the digital broadcast signal corresponding to a service (a channel) selected by the user, and outputs the resultant TS (transport stream) to the multiplexing/separating unit 62.

The multiplexing/separating unit 62 separates an audio encoded signal and a video encoded signal from the TS input from the tuner 61, and outputs the audio encoded signal to the audio decoder 63 and the video encoded signal to the video decoder 65 and the analyzing unit 66. Further, the multiplexing/separating unit 62 separates the control signal containing the SDT or EIT that may contain the application control descriptor from the TS, and outputs the control signal to the analyzing unit 66.

The audio decoder 63 decodes the input audio encoded signal, and outputs the resultant audio signal to the audio output unit 64. The audio output unit 64 outputs the input audio signal to a later stage (a speaker, for example).

The video decoder 65 decodes the input video encoded signal, and outputs the resultant video signal to the analyzing unit 66 and the video output unit 67.

The analyzing unit 66 detects and analyzes the application control descriptor contained in the SDT or EIT input from the multiplexing/separating unit 62. The analyzing unit 66 then performs an operation in accordance with the analysis result, and notifies the control unit 68 of the analysis result. The analyzing unit 66 detects and analyzes the command information contained in the video encoded signal input from the multiplexing/separating unit 62, or detects and analyzes the command information encoded and embedded in the video signal input from the video decoder 65. The analyzing unit 66 then performs an operation in accordance with the analysis result, and notifies the control unit 68 of the analysis result.

The analyzing unit 66 also generates the command for the external device 40 in accordance with the analysis result, and outputs the command to the external I/F 76. Further, the analyzing unit 66 acquires the application control data from the server 22 via the communication I/F 72 and the Internet 3.

Figure 6:
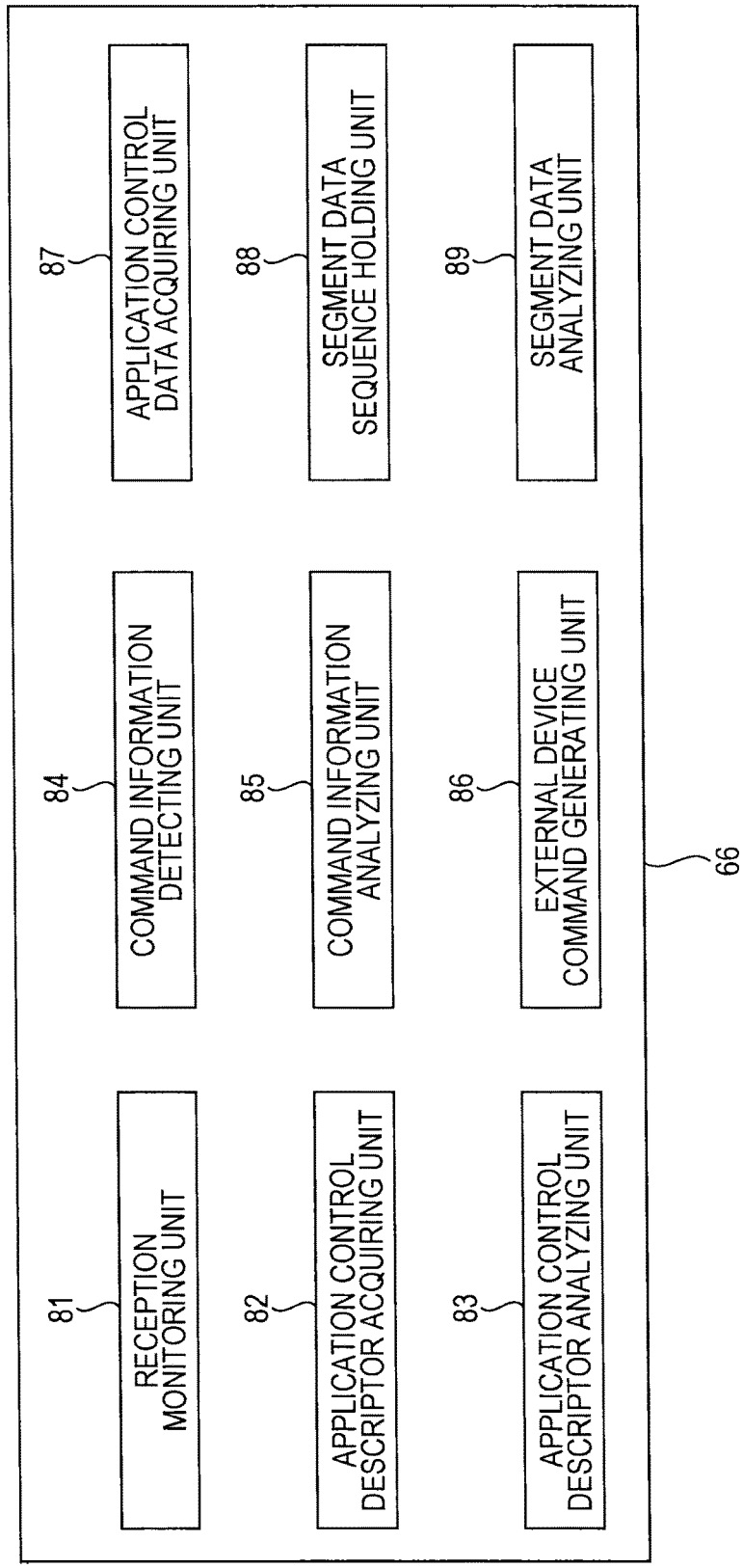
FIG. 6 is a diagram showing the functional blocks contained in the analyzing unit of the receiving device.

FIG. 6 shows the functional blocks contained in the analyzing unit 66. The analyzing unit 66 includes a reception monitoring unit 81, an application control descriptor acquiring unit 82, an application control descriptor analyzing unit 83, a command information detecting unit 84, a command information analyzing unit 85, an external device command generating unit 86, an application control data acquiring unit 87, a segment data sequence holding unit 88, and a segment data analyzing unit 89.

The reception monitoring unit 81 monitors changes of services (channels) through selection, and the start and end of each show in the service being received. The application control descriptor acquiring unit 82 holds the SDT or EIT input from the multiplexing/separating unit 62, and acquires the application control descriptor from the SDT or EIT. The application control descriptor analyzing unit 83 analyzes the application control descriptor corresponding to the selected service or show.

The command information detecting unit 84 detects the command information contained in the video encoded signal input from the multiplexing/separating unit 62, or detects the command information encoded and embedded in the video signal input from the video decoder 65. The command information analyzing unit 85 analyzes the detected command information. The external device command generating unit 86 generates the command for the external device 40, based on the result of analysis of the application control descriptor, the command information, or segment data.

The application control data acquiring unit 87 acquires the application control data from the server 22, based on the result of analysis of the application control descriptor corresponding to the selected service or show. The segment data holding unit 88 holds the segment data sequence that forms the acquired application control data. The segment data analyzing unit 89 analyzes each set of the segment data forming the segment data sequence.

Referring back to FIG. 5, the video output unit 67 outputs the video signal input from the video decoder 65 to a later stage (a display, for example). The video output unit 67 also combines the video image of the new information service input from the application engine 74 with the video signal input from the video decoder 65, and outputs the result to a later stage.

The control unit 68 controls the entire receiving device 30 by executing a control program recorded in the memory 69. Based on the analysis result supplied from the analyzing unit 66, the control unit 68 also controls the acquirement (registration) of the new information service application, the start of the application, firing of an event, a suspension of the application, the end of the application, and the like.

The control program to be executed by the control unit 68 is recorded in the memory 69. This control program can be updated based on the digital broadcast signal or update data supplied via the Internet 3. The operating unit 70 receives various kinds of operations from the user, and notifies the control unit 68 of the operating signals corresponding to those operations.

The memory 69 also holds user profile information, such as the age, gender, address, and the like of the user, which is input beforehand by the user.

This profile information is referred to by the new information service application being executed, for example, and can be used by the new information service application being executed to fire an event only when the user profile information satisfies predetermined conditions.

Under the control of the analyzing unit 66 or the application engine 74, the communication I/F 72 connects to the server 22 via the Internet 3. Under the control of the control unit 68, the application engine 74 acquires the new information service application from the server 22 via the communication I/F 72 and the Internet 3, and stores the new information service application into the cache memory 73.

Under the control of the control unit 68, the application engine 74 reads the new information service application stored in the cache memory 73, and executes the new information service application.

The application memory 75 includes a working memory 75A and a saving memory 75B. The application engine 74 records the data about the new information service application being executed in the working memory 75A. When suspending the execution of the new information service application being executed, the application engine 74 moves the data in the working memory 75A of the application memory 75 to the saving memory 75B. When resuming the suspended new information service application, the data in the saving memory 75B is moved to the working memory 75A, to restore the previous situation.

Alternatively, of the two regions of the same size in the application memory 75, one may alternately serve as the working memory 75A, and the other one may alternately serve as the saving memory 75B. In this manner, the data does not need to be moved between the working memory 75A and the saving memory 75B.

The external I/F 76 not only establishes a wireless or wired connection with the external device 40, but also identifies the type of the external device 40 and notifies the analyzing unit 66 of the identification result. The external I/F 76 also transmits the command that is input for the external device 40 from the analyzing unit 66, to the external device 40.

[Example Structure of the External Device 40]

Figure 7:
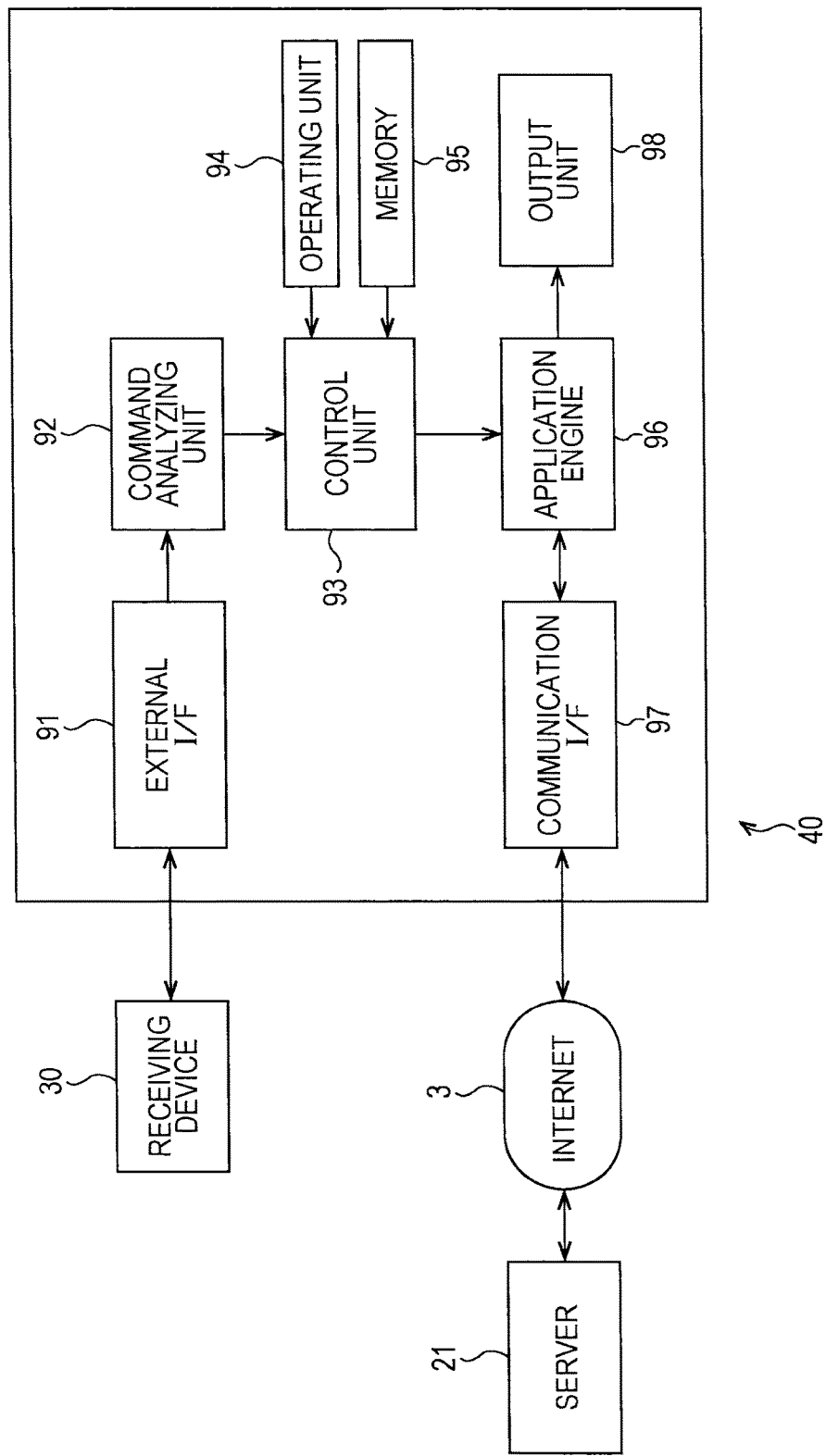
FIG. 7 is a block diagram showing an example structure of an external device.

FIG. 7 shows an example structure of the external device 40. It should be noted that FIG. 7 shows only the components related to execution of the new information service application, and does not show the components not related to execution of the new information service application.

The external device 40 includes an external I/F 91, a command analyzing unit 92, a control unit 93, an operating unit 94, a memory 95, an application engine 96, a communication I/F 97, and an output unit 98.

The external I/F 91 has a wireless or wired connection with the external I/F 76 of the receiving device 30, and outputs the command supplied from the receiving device 30 to the command analyzing unit 92. The command analyzing unit 92 analyzes the command from the receiving device 30, and outputs the analysis result to the control unit 93.

The control unit 93 controls the entire external device 40 by executing a control program (Android or iOS as a platform) recorded in the memory 65. Based on the analysis result supplied from the command analyzing unit 92, the control unit 93 also controls the acquirement (registration) of the new information service application, the start of the application, firing of an event, a suspension of the application, the end of the application, and the like.

The control program to be executed by the control unit 93 is recorded in the memory 95. The operating unit 94 receives various kinds of operations from the user, and notifies the control unit 93 of the operating signals corresponding to those operations.

Under the control of the control unit 93, the application engine 96 acquires the new information service application from the server 22 via the communication I/F 97 and the Internet 3, and executes the new information service application. The video signal and audio signal of the information related to the show being received by the receiving device 30 are acquired as a result of the execution, and are output to the output unit 98. Under the control of the application engine 96, the communication I/F 97 connects to the server 22 via the Internet 3.

The output unit 98 displays the video image corresponding to the video signal input from the application engine 96, and outputs the sound corresponding to the audio signal.

[Application Control Descriptor]

Next, the application control descriptor that is contained in a digital broadcast signal and is then broadcast is described. The application control descriptor is broadcast, contained in the SDT or the EIT of a digital broadcast signal.

FIG. 8 shows an example syntax of the application control descriptor.

In each application control descriptor, "descriptor_tag" indicating the corresponding service (channel) or show, "descriptor_length" indicating the data length of the application control descriptor, and "application_control_type" indicating the application control type are written.

In a case where the application control type is 1, "descriptor_device_type" for identifying the device (a descriptor destination device) that performs operations to acquire and execute the new information service application based on the application control descriptor is written.

As the descriptor destination device, the receiving device main unit that has received the application control descriptor, or an external device of a distinguishable type can be designated. Further, any combination of the receiving device main unit and respective external device types can be designated. For example, the external device type-1 and the external device type-2 can be simultaneously designated as descriptor destination devices, or the receiving device main unit and the external device type-2 can be simultaneously designated as descriptor destination devices.

In each application control descriptor, "application_id" for identifying the new information service application to be acquired, "app_url_length" indicating the data length of the URL for identifying the destination (the server 22) from which the new information service application is to be acquired, and "app_url_byte" indicating the URL are written.

Further, "app type" indicating the type (such as HTML5, BML, or Java (a registered trademark)) of the new information service application, "app_life_scope" indicating the valid operating range of the new information service application when channels or shows are changed, and "app_expire_date" indicating the expiration date of the new information service application are written as the information about the new information service application.

In a case where the application control type is 3, "app_control_data_url_length" indicating the data length of the URL for identifying the destination (the server 22) from which the application control data is to be acquired, and "app_control_data_url_byte" indicating the URL are written.

[Command Information]

Next, the command information contained in a video stream of a digital broadcast signal is described.

FIG. 9 shows the information items contained in the command information. FIG. 10 shows an example syntax of the command information.

Command ID (command_id) is the identification information for the command information. In a case where command information containing the same content is transmitted more than once, the command ID of each piece of command information is the same. Provider ID (provide_id) is the information indicating the provider who provides users with the new information service application.

Command destination device type (command_destination_device_type) indicates the device (a command destination device) that controls operations related to the new information service application based on the command information. As the command destination device, the receiving device main unit that has received the command information, or an external device of a distinguishable type can be designated. Further, any combination of the receiving device main unit and respective external device types can be designated. For example, the external device type-1 and the external device type-2 can be simultaneously designated as command destination devices, or the receiving device main unit and the external device type-2 can be simultaneously designated as command destination devices.

Command code (command_code) indicates the type of the command information, or more specifically, indicates the acquirement (registration) of the new information service application, the start of the application, the end of the application, an event, or a suspension of the application.

Command validity probability parameter (command_validity) indicates the value N for designating the probability when each receiving device 30 that has received the command information is determined to perform an operation in accordance with the command information, so as to disperse access from the receiving devices 30 to the server 22.

For example, to divide the access from possibly a large number of receiving devices 30 to the server 22 into four, the same command information is transmitted four times. The validity parameter N in the first command information transmission should be 4, the validity parameter N in the second command information transmission should be 3, the validity parameter N in the third command information transmission should be 2, and the validity parameter N in the fourth command information transmission should be 1.

As the receiving devices 30 are notified of the command validity probability, the access can be dispersed so that the receiving devices 30 do not access the server 22 and acquire the new information service application at once.

When the command information for not accessing the server 22 or the like (the command code indicating a suspension or an end of the new information service application), the command validity probability should be always 1.

Application ID (application_id) is the identification information for the new information service application corresponding to the command information. Application URL (app_url_byte) is the URL of the destination (the server 22 in the present case) from which the new information service application is to be acquired.

Application type (application_type) is the information indicating the type (such as HTML5, BML, or Java (a registered trademark)) of the new information service application corresponding to the command information. Application valid range (app_life_scope) indicates the range in which the operation of the new information service application being executed continues when channels or shows are changed. Application expiration date (app_expire_date) indicates the date until which the new information service application to be acquired can be activated (the expiration date on which the new information service application to be acquired will expire).

Event ID (event_id) is the identification information for an event in a case where the command code of the command information indicates the event. Event added information (event_embedded_data_byte) is the data to be incorporated into the new information service application when the event is fired.

Figure 13:
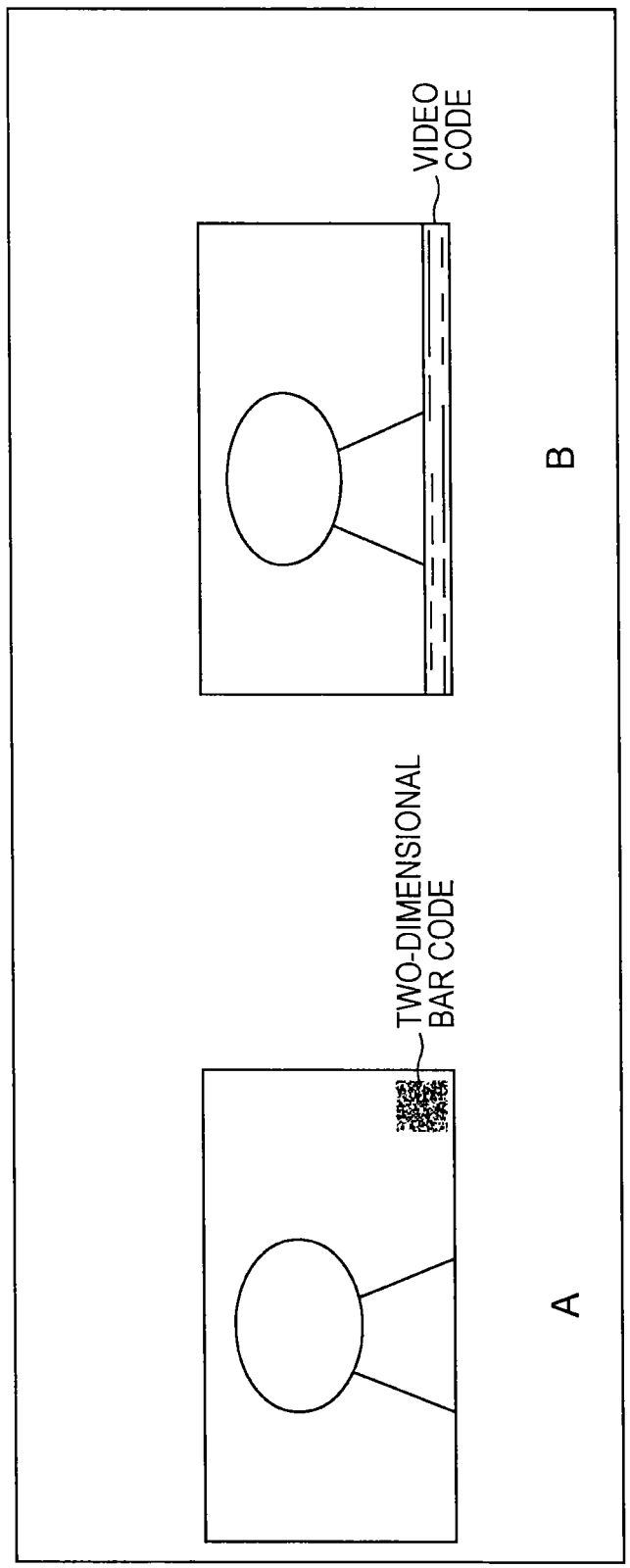
FIG. 13 is a diagram showing examples of coded command information embedded in a video image.

FIGS. 11 through 13 show the placement of the command information in a digital broadcast signal.

As shown in FIGS. 12 and 13, the command information is placed in "extensions_and_user_data" in a MPEG2 video stream corresponding to the video image of a show, for example.

Figure 14:
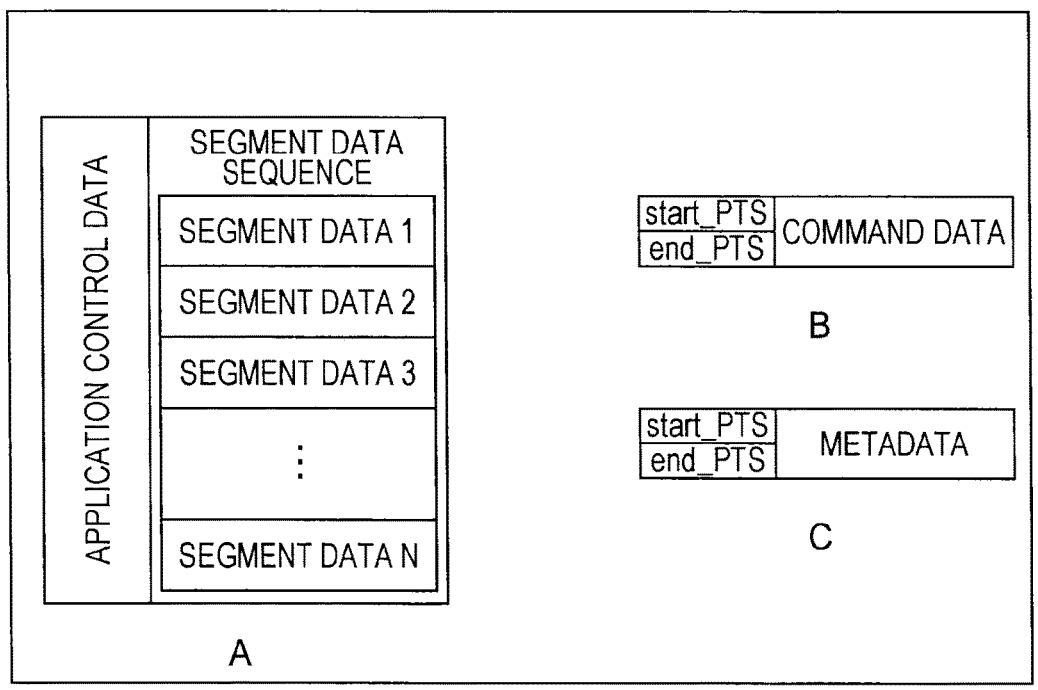
FIG. 14 is a diagram showing the structure of application control data.

Alternatively, as shown in FIG. 14, the command information is encoded and embedded in the video image of the show, and is then broadcast.

A in the drawing shows an example case where the command information is turned into a two-dimensional bar code, and is superimposed on a predetermined portion (in this case, at the lower right corner) of the video image. B in the drawing shows an example case where the command information is turned into a video code, and is combined with a few lines at the bottom of the video image. The command information combined with the video image is detected by the analyzing unit 66 of the receiving device 30.

In either of the examples shown in A and B, the command information is placed on the video image of the show. For example, even in a case where the television show is to be re-distributed through a CATV network, the command information is not deleted, and can be transmitted to the receiving device 30.

Also, in either of the examples shown in A and B, the command information on the video image can be visually recognized by the user of the receiving device 30. If the visual recognition is not preferred, the two-dimensional bar code or the video code equivalent to the command information is masked with the same pixels as the pixels surrounding the bar code or the video code before displayed.

The placement of the command information in a digital broadcast signal is not limited to the examples shown in FIGS. 12 through 14.

[Application Control Data]

Next, the application control data supplied from the server 22 to the receiving device 30 is described.

FIG. 14 shows the structure of the application control data. As shown in A in the drawing, the application control data is formed with a segment data sequence including sets of segment data.

As shown in B in the drawing, each set of the segment data is formed with "start_pts" and "end_pts" indicating two points in the corresponding time axis of the show as the segment valid period, and command data. Alternatively, each set of the segment data is formed with the segment valid period and metadata, as shown in C in the drawing. That is, each set of the segment data contains command data or metadata, so that segment data containing command data and segment data containing metadata can coexist in each set of application control data (the segment data sequence).

FIGS. 15 through 20 show specific examples of data structures of segment data sequences. The data structures are assumed to be written in XML. The items with "@" indicate attributes accompanying higher elements, and other items indicate elements.

FIG. 15 shows the data structure of a segment data sequence. In the segment data sequence (segment_sequence), "@segment_number" indicating the number, "start_pts" indicating the PTS value of the start time of the segment valid period, and "end_pts" indicating the PTS value of the finish time of the segment valid period are written for each set of segment data. The PTS values can be counter values of a 90 KHz clock embedded in a video stream or an audio stream, or may be absolute times indicated by hours, minutes and seconds, or relative times from the start of the show. Further, command data or metadata is written.

FIGS. 16 and 17 show the structures of command data in segment data.

"@destination" indicates the device (command destination device) that controls operations related to the new information service application based on the command data. As the command destination device, the receiving device main unit that has received the command information, or an external device of a distinguishable type can be designated. Further, any combination of the receiving device main unit and respective external device types can be designated. For example, the external device type-1 and the external device type-2 can be simultaneously designated as command destination devices, or the receiving device main unit and the external device type-2 can be simultaneously designated as command destination devices. "@action" indicates the type of the command data, or more specifically, indicates the acquirement of the new information service application, the start of the application, the end of the application, an event, or a suspension of the application.

"diffusion" is the information for dispersing the time to apply the command data, like the command validity probability parameter in the command information. In "diffusion", "@rate" indicating the number of divisions, "@range" indicating the maximum delay time, and "@period" indicating the command destination dispersing period are written.

"application" is the information related to the new information service application being controlled, and in "application", "@id" as the identification information for the new information service application, "@url" indicating the destination from which the new information service application is acquired, "@expire_date" indicating the expiration date of the new information service application, and "@scope" indicating the valid range of the new information service application are written.

"event" is the information related to an event to be fired by the new information service application being executed, and in "event", "@id" as the identification information for the event, and "@related_data" indicating the data to be incorporated into the new information service application at the time of firing the event are written.

FIG. 18 shows the structure of metadata in segment data.

"@type" indicates the type of the metadata. The type of the metadata may be application data (application_data), text subtitles data (caption), or bitmap subtitles data (subtitle), for example. In "@target", the identification information for the new information service application corresponding to the metadata is written. Thereafter, the information about the respective types of metadata are written.

FIG. 19 shows a structure in which the metadata type is bitmap subtitles data. The bitmap subtitles data contains "@id" indicating the subtitles sequence number, "@left" indicating the position of the left end of the subtitles display area, "@upper" indicating the position of the upper end of the subtitles display area, "@right" indicating the position of the right end of the subtitles display area, "@lower" indicating the position of the lower end of the subtitles display area, and "bitmap" as the bitmap data corresponding to the character string of the subtitles.

FIG. 20 shows a structure in which the metadata type is text subtitles data. The text subtitles data contains "@id" indicating the subtitles sequence number, "@color" designating the color of the subtitles, "@region_left" indicating the horizontal position of the start of the subtitles display, "@region_upper" indicating the vertical position of the start of the subtitles display, "@size" indicating the character size of the subtitles, "@font" indicating the character font of the subtitles, and "text" as the character string of the subtitles.

FIG. 21 shows an example syntax of a segment data sequence.

In the example shown in the drawing, the segment data sequence is formed with three sets of segment data. The segment data having segment number 1 is command data having a segment valid period from 12000 to 15000, and has a receiving device main unit as the command destination device, the command type being a start. The segment data having segment number 2 is command data having a segment valid period from 13000 to 13100, and has a receiving device main unit as the command destination device, the command type being an event. The segment data having segment number 3 is metadata having a segment valid period from 12000 to 20000, and the metadata type is application data.

FIG. 22 shows an example syntax in a case where the metadata type of segment data is bitmap subtitles data.

In the example shown in the drawing, the segment number is 10, the segment valid period is from 10000 to 12000, and the metadata type is "subtitles". Also, the subtitles sequence number is 1, the position of the left end of the subtitles display area 200, the position of the upper end of the subtitles display area is 100, the position of the right end of the subtitles display area is 1400, and the position of the lower end of the subtitles display area is 300.

Figure 23:
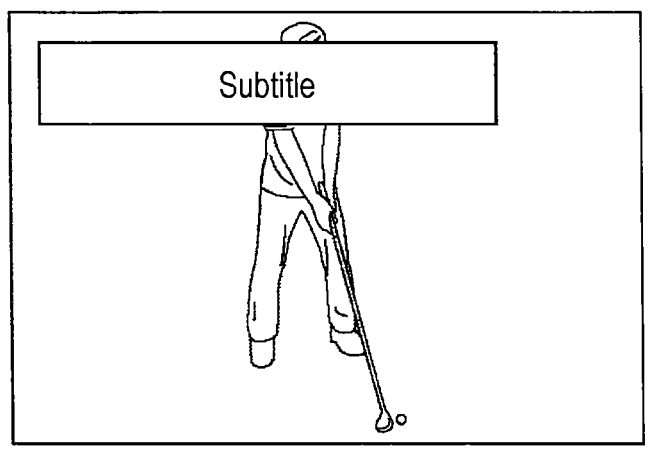
FIG. 23 is a diagram showing an example of subtitles displayed by using the metadata (bitmap subtitles data) of segment data.

In the receiving device 30 that has received the segment data shown in the drawing, the subtitles formed with the bitmap is combined with the video image and is displayed, as shown in FIG. 23, for example.

FIG. 24 shows an example syntax in a case where the metadata type of segment data is text subtitles data ("caption").

In the example shown in the drawing, the segment number is 10, the segment valid period is from 10000 to 12000, and the metadata type is "caption". Also, the subtitles sequence number is 1, the horizontal position of the start of the subtitles display is 200, the vertical position of the start of the subtitles display is 100, the character size is 20, and the subtitles color is red.

Figure 25:
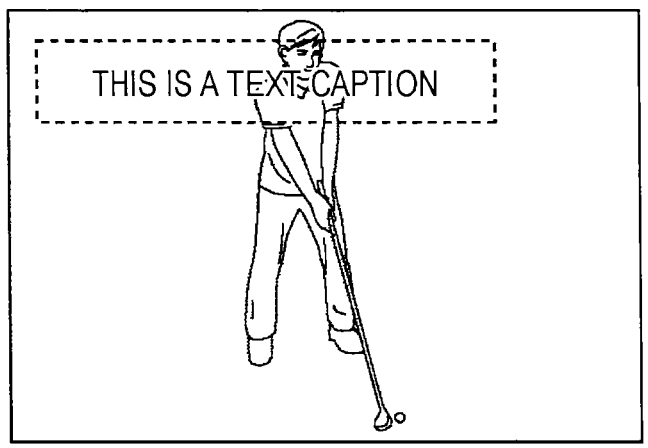
FIG. 25 is a diagram showing an example of subtitles displayed by using the metadata (text subtitles data) of segment data.

In the receiving device 30 that has received the segment data shown in the drawing, the subtitles based on the text is combined with the video image and is displayed, as shown in FIG. 25, for example.

[Operations of the Receiving Device 30]

Figure 26:
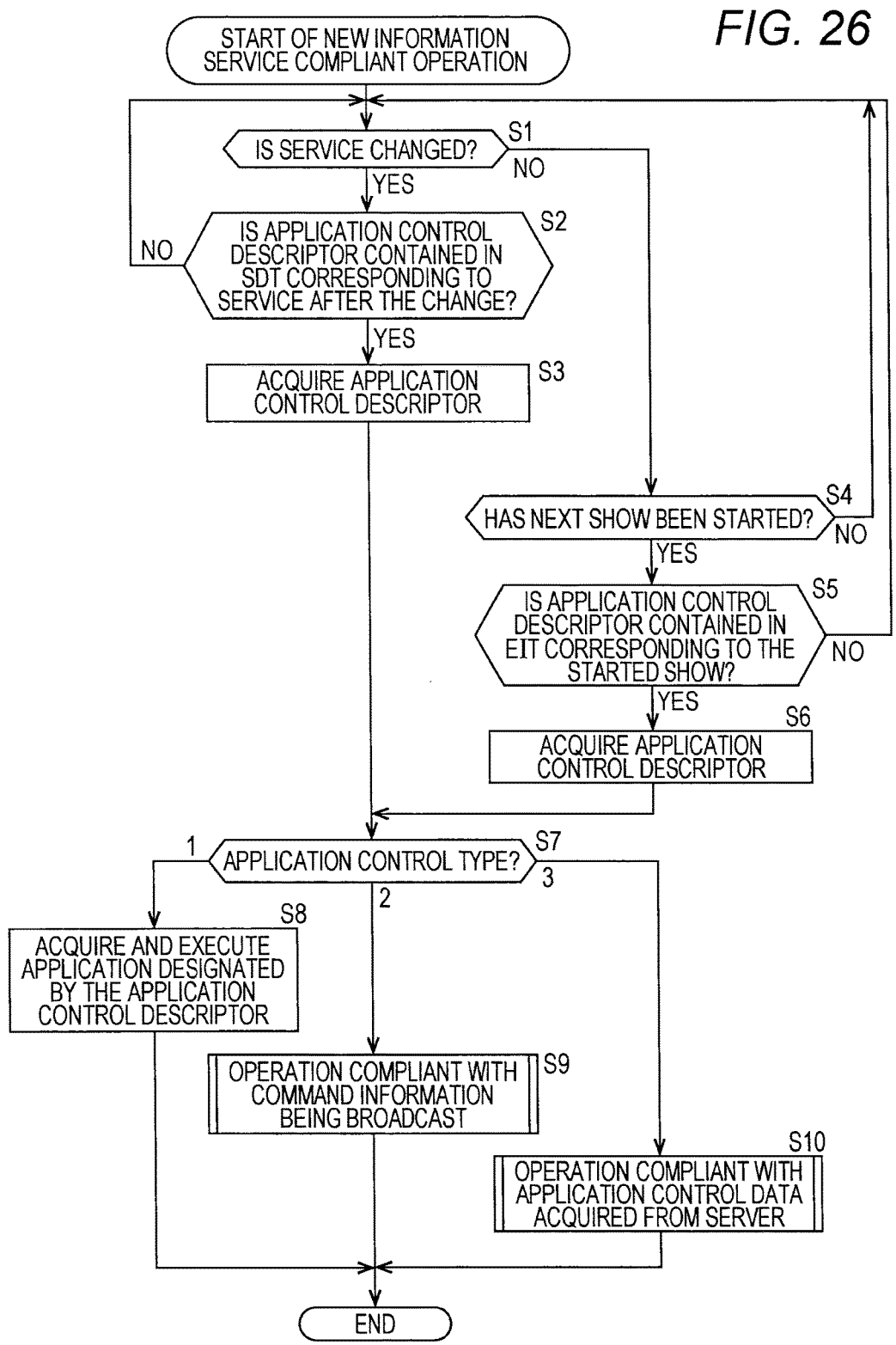
FIG. 26 is a flowchart for explaining a new information service compliant operation to be performed by the receiving device.

Next, operations of the receiving device 30 are described. FIG. 26 is a flowchart for explaining a new information service compliant operation to be performed by the receiving device 30.

This new information service compliant operation is repeatedly performed while the receiving device 30 is receiving the show, and the receiving device 30 is assumed to have acquired and hold the SDT or EIT contained in a digital broadcast signal.

In step S1, the reception monitoring unit 81 of the analyzing unit 66 determines whether services (channels) are changed by a user. If the reception monitoring unit 81 determines that services are changed, the operation moves on to step S2.

In step S2, the application control descriptor acquiring unit 82 determines whether an application control descriptor is contained in the SDT corresponding to the service after the change. If an application control descriptor is contained, the application control descriptor acquiring unit 82 acquires the application control descriptor in step S3. If it is determined that any application control descriptor is not contained in the SDT corresponding to the service after the change, on the other hand, the operation returns to step S1.

If it is determined in step S1 that services are not changed by the user, the operation moves on to step S4. In step S4, the reception monitoring unit 81 determines whether the next show has started in the service being received. If the next show has started, the operation moves on to step S5. If the next show has not started, the operation returns to step S1.

In step S5, the application control descriptor acquiring unit 82 determines whether an application control descriptor is contained in the EIT corresponding to the started show. If an application control descriptor is contained, the application control descriptor acquiring unit 82 acquires the application control descriptor in step S6. If it is determined that any application control descriptor is not contained in the EIT corresponding to the started show, on the other hand, the operation returns to step S1.

In step S7, the application control descriptor analyzing unit 83 analyzes the application control descriptor acquired in step S3 or S6, and determines the application control type among 1, 2, and 3.

If it is determined in step S7 that the application control type of the application control descriptor is 1, the operation moves on to step S8. In step S8, if the result of the analysis of the application control descriptor shows that the descriptor destination device is a receiving device main unit, the application control descriptor analyzing unit 83 notifies the control unit 68 of the result of the analysis of the application control descriptor. Under the control of the control unit 68, the application engine 74 acquires the new information service application from the server 22, and starts the application. The started new information service application is then executed continuously in the valid operating range indicated by "app_life_scope" contained in the application control descriptor. When the service or show being received exceeds the valid operating range, the new information service application is ended.

As described above, when the application control type of the application control descriptor is 1, the new information service application can be acquired and started in synchronization with shows and commercials, based on the application control descriptor.

If it is determined in step S7 that the application control type of the application control descriptor is 2, the operation moves on to step S9. In step S9, an operation compliant with the command information being broadcast (a command information compliant operation) is performed.

Figure 27:
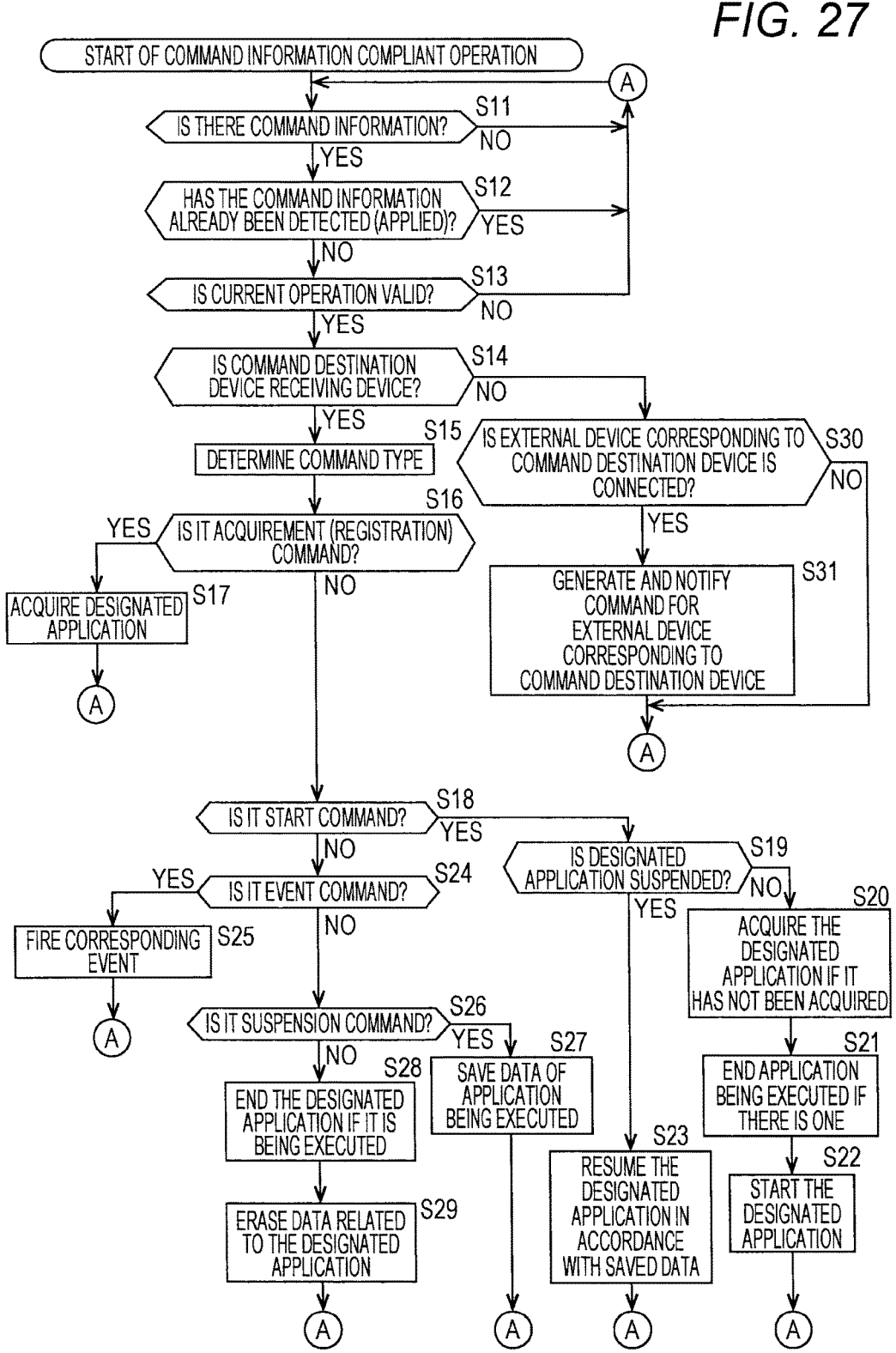
FIG. 27 is a flowchart for explaining in detail a command information compliant operation.

The command information compliant operation is now described. FIG. 27 is a flowchart for explaining in detail the command information compliant operation.

In step S11, the command information detecting unit 84 starts searching for command information from the digital broadcast signal being received, and stands by until detecting command information. When command information is detected, the operation moves on to step S12.

In step S12, the command information analyzing unit 85 reads the command ID of the command information detected in step S11, and determines whether the procedures of step S14 and the later steps have already been carried out for the command information. If it is determined that the procedures of step S14 and the later steps have already been carried out, the operation returns to step S11. If it is determined that the procedures of step S14 and the later steps have not been carried out for the command information, the operation moves on to step S13.

In step S13, the command information analyzing unit 85 determines whether the current operation is valid (or whether to move the operation on to step S14 or whether to return the operation to step S11), based on the command validity probability parameter N in the command information. If there is no command validity probability parameter N written in the command information (including a case where the validity probability parameter N is 1), the operation moves on to step S14.

In step S14, the command information analyzing unit 85 refers to the command destination device type in the command information, and determines whether the command destination device is a receiving device main unit. If it is determined that the command destination device is a receiving device main unit, the operation moves on to step S15.

In step S15, the command information analyzing unit 85 refers to the command code in the command information, and determines the command type among "acquirement (registration)", "start", "event", "suspension", and "end".

In step S16, the command information analyzing unit 85 determines whether the command type is "acquirement". If the command type is "acquirement", the operation moves on to step S17.

In step S17, the command information analyzing unit 85 supplies the command information to the control unit 68. The control unit 68 controls the application engine 74 to acquire the new information service application identified by the application ID in the command information, from the server 22 identified by the application URL. The acquired new information service application is stored into the cache memory 73.

If it is determined in step S16 that the command type is not "acquirement", the operation moves on to step S18. In step S18, the command information analyzing unit 85 determines whether the command type is "start". If the command type is "start", the operation moves on to step S19.

In step S19, the command information analyzing unit 85 supplies the command information to the control unit 68. The control unit 68 determines whether the new information service application identified by the application ID in the command information is suspended (in a suspended state). Specifically, if data indicating a suspended state is saved in the saving memory 75B, the new information service application is determined to be suspended.

If it is determined in step S19 that the new information service application is not suspended, the operation moves on to step S20. In step S20, under the control of the control unit 68, the application engine 74 acquires the program data of the new information service application identified by the application ID in the command information, if the program data has not been acquired (or is not stored in the cache memory 73).

In step S21, under the control of the control unit 68, the application engine 74 ends the new information service application being currently executed, if there is one. In step S22, under the control of the control unit 68, the application engine 74 starts the new information service application identified by the application ID in the command information. The operation then returns to step S11, and the procedures thereafter are repeated.

If it is determined in step S19 that the new information service application identified by the application ID is suspended (in a suspended state), the operation moves on to step S23. In step S23, under the control of the control unit 68, the application engine 74 moves the data in the saving memory 75B to the working memory 75A, and starts the new information service application identified by the application ID. As a result, the suspended new information service application is resumed from the suspended state. The operation then returns to step S11, and the procedures thereafter are repeated.

If it is determined in step S18 that the command type is not "start", the operation moves on to step S24. In step S24, the command information analyzing unit 85 determines whether the command type is "event". If the command type is determined to be "event", the operation moves on to step S25.

In step S25, the command information analyzing unit 85 supplies the command information to the control unit 68. Only when the application ID in the command information matches the application ID of the new information service application being executed, does the control unit 68 control the application engine 74 so that the event corresponding to the event ID in the command information is fired (executed) in the new information service application being executed. The operation then returns to step S11, and the procedures thereafter are repeated.

If it is determined in step S24 that the command type is not "event", the operation moves on to step S26. In step S26, the command information analyzing unit 85 determines whether the command type is "suspension". If the command type is determined to be "suspension", the operation moves on to step S27.

In step S27, the command information analyzing unit 85 supplies the command information to the control unit 68. Under the control of the control unit 68, the application engine 74 saves the data indicating the state of the new information service application being currently executed (or the data currently written in the work memory 75A) into the saving memory 75B, and then ends the new information service application being currently executed. The operation then returns to step S11, and the procedures thereafter are repeated.

If it is determined in step S26 that the command type is not "suspension", the command type should be "end", and the operation moves on to step S28. In step S28, the command information analyzing unit 85 supplies the command information to the control unit 68. Under the control of the control unit 68, the application engine 74 ends the new information service application identified by the application ID in the command information, if the application is being executed.

In step S29, under the control of the control unit 68, the application engine 74 erases the data related to the new information service application identified by the application ID from the working memory 75A and the saving memory 75B, and erases the new information service application from the cache memory 73. The operation then returns to step S11, and the procedures thereafter are repeated.

If it is determined in step S14 that the command destination device is not a receiving device main unit, the operation moves on to step S30.

In step S30, based on a notification from the external I/F 76, the command information analyzing unit 85 determines whether an external device 40 corresponding to the command destination device type in the command information is connected. If such an external device is connected, the operation moves on to step S31.

In step S31, the external device command generating unit 86 generates a command for the connected external device 40, based on the command destination device type, the command code, and the like in the command information. The external device 40 is notified of the generated command via the external I/F 76. In the external device 40, an operation in accordance with the command is performed. The operation then returns to step S11, and the procedures thereafter are repeated.

If it is determined in step S30 that any external device 40 corresponding to the command destination device type is not connected, step S31 is skipped.

Alternatively, the command for the external device 40 is not generated, and the command information is supplied directly to the external device 40. The external device 40 then analyzes the command information, and performs an operation in accordance with the analysis result.

The description of the command information compliant operation is now completed. Through the command information compliant operation performed when the application control type of the application control descriptor is 2, a new information service application can be acquired, be started, be made to fire an event, or be ended in synchronization with shows and commercials. Further, the new information service application can be suspended while maintained in an active state, and be resumed from the suspended state.

Referring back to FIG. 26, if it is determined in step S7 that the application control type of the application control descriptor is 3, the operation moves on to step S10. In step S10, an operation compliant with the application control data acquired from the server 22 (an application control data compliant operation) is performed.

Figure 28:
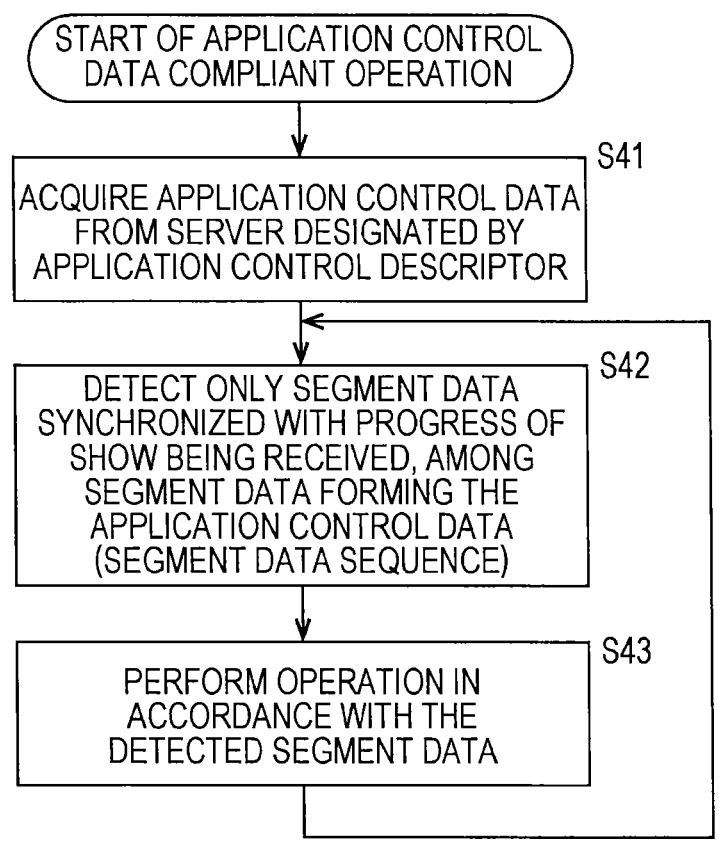
FIG. 28 is a flowchart for explaining in detail an application control data compliant operation.

The application control data compliant operation is now described. FIG. 28 is a flowchart for explaining in detail the application control data compliant operation.

In step S41, the application control data acquiring unit 87 acquires the application control data from the server 22 identified by "app_control_data_url_byte" in the application control descriptor. The acquired application control data (segment data sequence) is stored into the segment data sequence holding unit 88.

In step S42, the segment data analyzing unit 89 detects the segment data synchronized with progress of the show being received, among the segment data forming the stored segment data sequence. Specifically, the segment data having the PTS within the segment valid period is detected, the PTS indicating a point in progress of the show being received.

In step S43, if the detected segment data contains command data, the segment data analyzing unit 89 performs the same operation as the above described command information compliant operation. If the detected segment data contains metadata, an operation compliant with the metadata (such as an operation to display subtitles as described above with reference to FIGS. 19 through 25) is performed. The operation then returns to step S42, and the procedures thereafter are repeated.

The description of the application control data compliant operation is now completed. Through the application control data compliant operation performed when the application control type of the application control descriptor is 3, a new information service application can be acquired, be started, be made to fire an event, or be ended in synchronization with shows and commercials, as in the command information compliant operation. Also, the new information service application can be suspended while maintained in an active state, and be resumed from the suspended state. Further, through the application control data compliant operation, the subtitles and the like corresponding to a show can be displayed by using the metadata contained in the segment data.

However, the method of dispersing the time to access the server 22 from receiving devices 30 differs from that in the command information compliant operation. In the application control data compliant operation, the time to access the server 22 is dispersed based on "diffusion" in the command data in the segment data.

Figure 29:
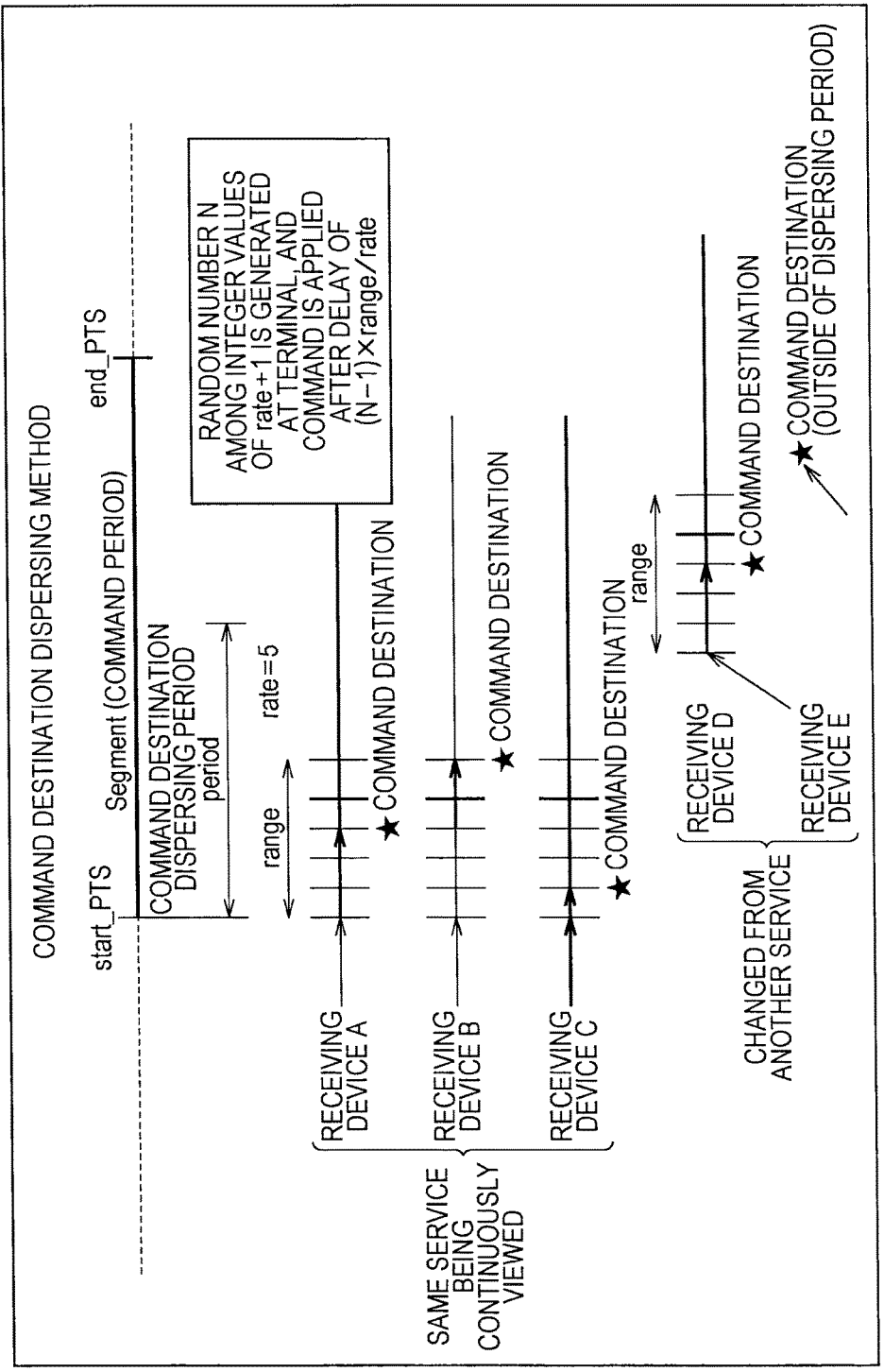
FIG. 29 is a diagram for explaining dispersed access to a server based on "diffusion".

FIG. 29 shows the method of dispersing the time to access the server 22, based on "diffusion" (the number of divisions "rate", the maximum delay time "range", and the command destination dispersing period "period").

The receiving device 30 that operates in accordance with the command data contained in segment data in the application control data generates a random number N that is a positive integer in the range of 0 to "rate+1". Further, the delay time d="(N−1)×range/rate" is calculated. A receiving device 30 that has been continuously receiving the same service executes a command when the delay time d passes since "start_PTS" in segment data (as in the cases of the receiving devices A, B, and C in the drawing).

As a result, the access to the server 22 from the receiving devices 30 can be dispersed within the command destination dispersing period.

A receiving device 30 that has the selected service changed to this service executes a command when the delay time d passes since the time of the service selection, as long as the time of the service selection falls within the command destination dispersing period (as in the case of the receiving device D in the drawing). If the time of service selection is outside the command destination dispersing period, a command is executed when a service is selected (as in the case of the receiving device E in the drawing).

[State Transitions of a New Information Service Application]

Figure 30:
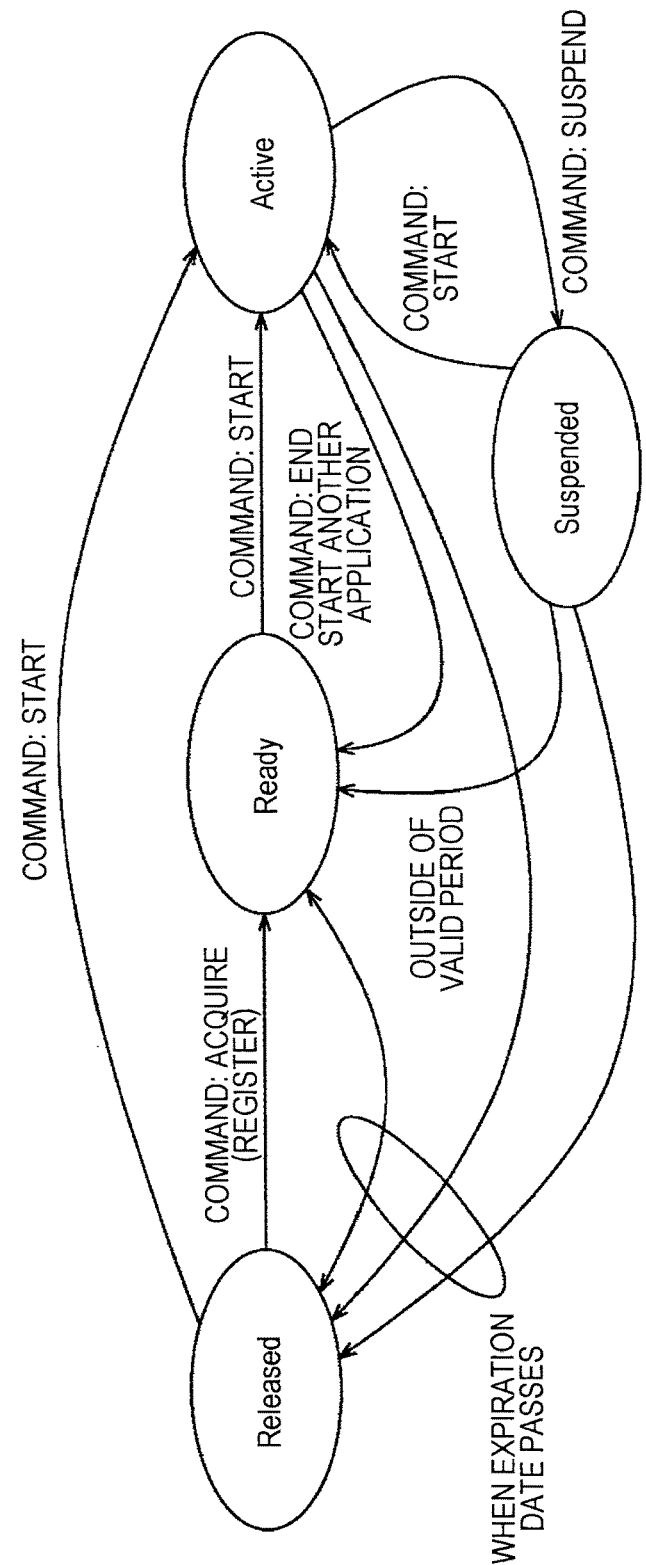
FIG. 30 shows state transitions of a new information service application.

FIG. 30 shows state transitions of a new information service application in the receiving device 30 or the external device 40.

As shown in the drawing, a new information service application transits to one of the four kinds of states: a released state (Released), a ready state (Ready), an active state (Active), and a suspended state (Suspended).

The released state is a state in which the new information service application has not been acquired. The ready state is a state in which the new information service application has been acquired but has not been executed. The active state is a state in which the new information service application is being executed. The suspended state is a state in which the execution of the new information service application is suspended, and the data indicating the state at the time of the suspension is stored in the saving memory 75B.

When the new information service application is acquired in accordance with an acquirement (registration) command in the released state, the new information service application transits to the ready state.

When the new information service application is acquired and started in accordance with a start command in the released state, the new information service application transits to the active state.

When the new information service application is started in accordance with a start command in the ready state, the new information service application transits to the active state.

When the expiration date of the acquired new information service application has passed in the ready state, the new information service application is erased and transits to the released state.

When the new information service application being executed is suspended in accordance with a suspension command in the active state, the new information service application transits to the suspended state.

When the new information service application is ended in accordance with an end command or another new information service application is started in the active state, the new information service application transits to the ready state if the expiration date has not passed yet.

When the new information service application is ended in accordance with an end command or another new information service application is started in the active state, the new information service application transits to the released state if the expiration date has already passed.

When a selected service is outside the application valid range of the new information service application in the suspended state, the new information service application transits to the ready state.

When the expiration date of the suspended new information service application has passed in the suspended state, the new information service application transits to the released state.

[Operation Scenarios for a New Information Service Application]

Figure 31:
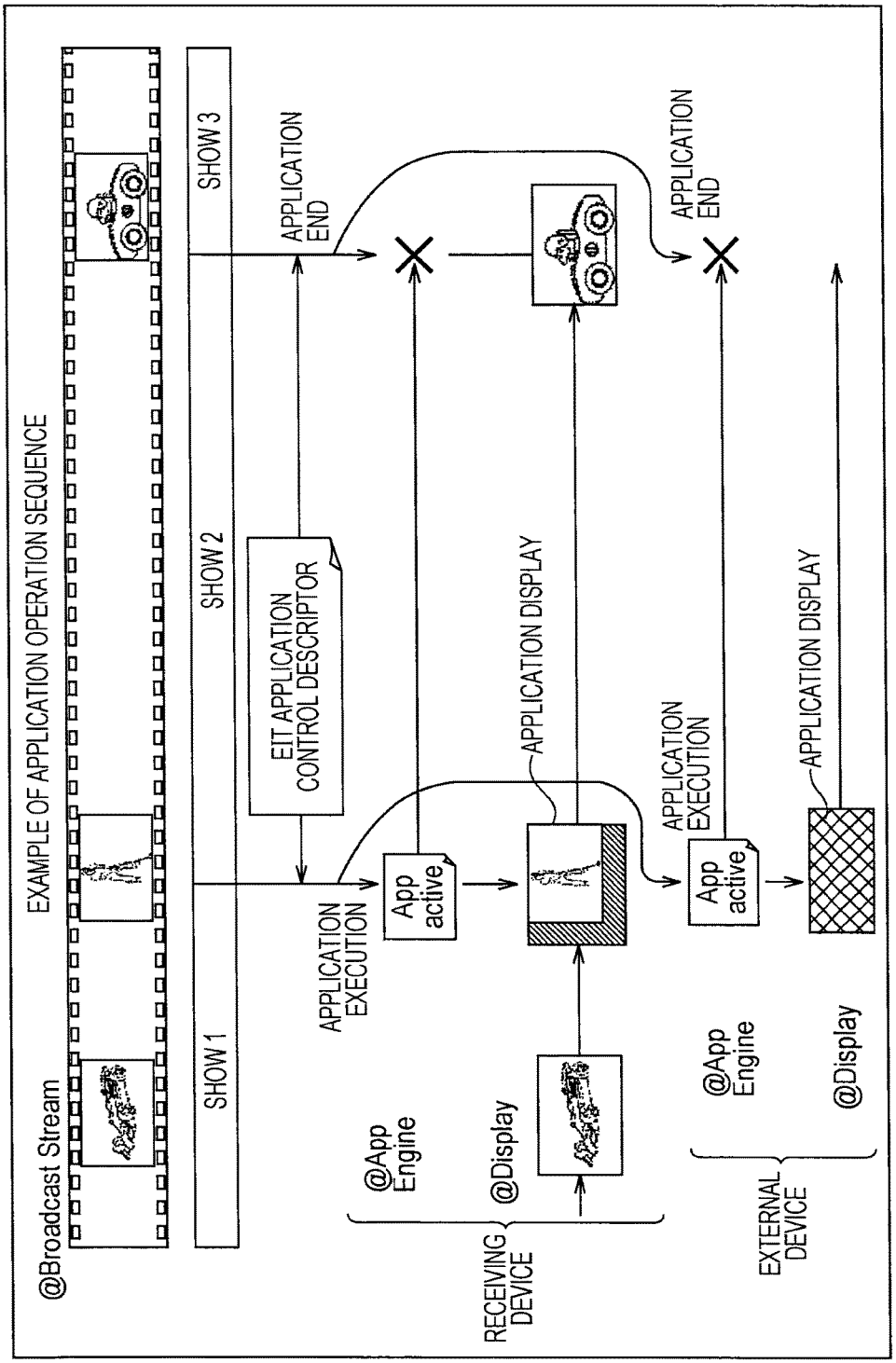
FIG. 31 is a diagram for explaining a first operation scenario for a new information service application.

FIG. 31 shows a first operation scenario for a new information service application. The first operation scenario corresponds to the case where the application control type of the application control descriptor is 1.

Specifically, when a show 2 starts following a show 1 in a service (channel) being received by the receiving device 30, the EIT for the show 2 is referred to. If the EIT contains an application control descriptor, and the application control type is 1, an operation based on the application control descriptor is performed. That is, if a receiving device main unit is designated as the descriptor destination device, the receiving device 30 can acquire the new information service application from the server 22, and start the new information service application. If the external device 40 is designated as the descriptor destination device, the receiving device 30 generates a command for the external device 40, and notifies the external device 40 of the command. The external device 40 then acquires the new information service application from the server 22, and executes the new information service application.

In the case illustrated in the drawing, the new information service application is started based on the application control descriptor contained in the EIT corresponding to the show. Therefore, the started new information service application is ended at the same time as the end of the show.

When the application control type of the application control descriptor is 1, the receiving device 30 does not need to detect and receive command information, or to acquire the application control data from the server 22. Accordingly, the processing load on the receiving device 30 can be reduced.

Figure 32:
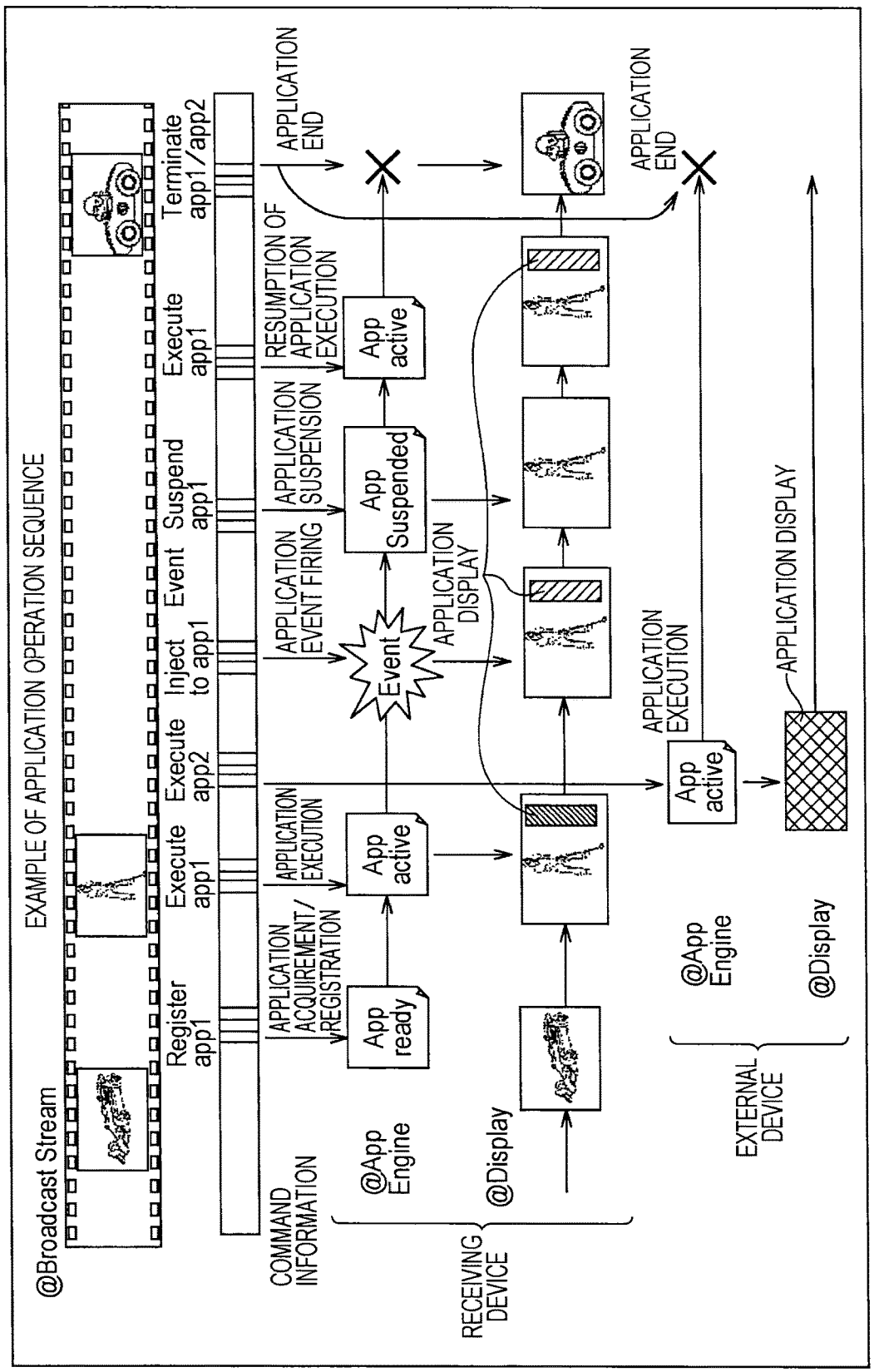
FIG. 32 is a diagram for explaining a second operation scenario for a new information service application.

FIG. 32 shows a second operation scenario for a new information service application. The second operation scenario corresponds to the case where the application control type of the application control descriptor is 2.

Specifically, the receiving device 30 receives command information that is contained in a digital broadcast signal and is then broadcast. If a receiving device main unit is designated as the command destination device, the receiving device 30 operates in accordance with the type of the command indicated by the command information. More specifically, the receiving device 30 acquires a new information service application, starts the application, causes the application to fire an event, suspends the application, resumes (restarts) the execution of the application, or ends the application. If the external device 40 is designated as the command destination device of the command information, the receiving device 30 generates a command for the external device 40, and notifies the external device 40 of the command. The external device 40 then acquires the new information service application from the server 22, executes the application, or ends the application.

Figure 33:
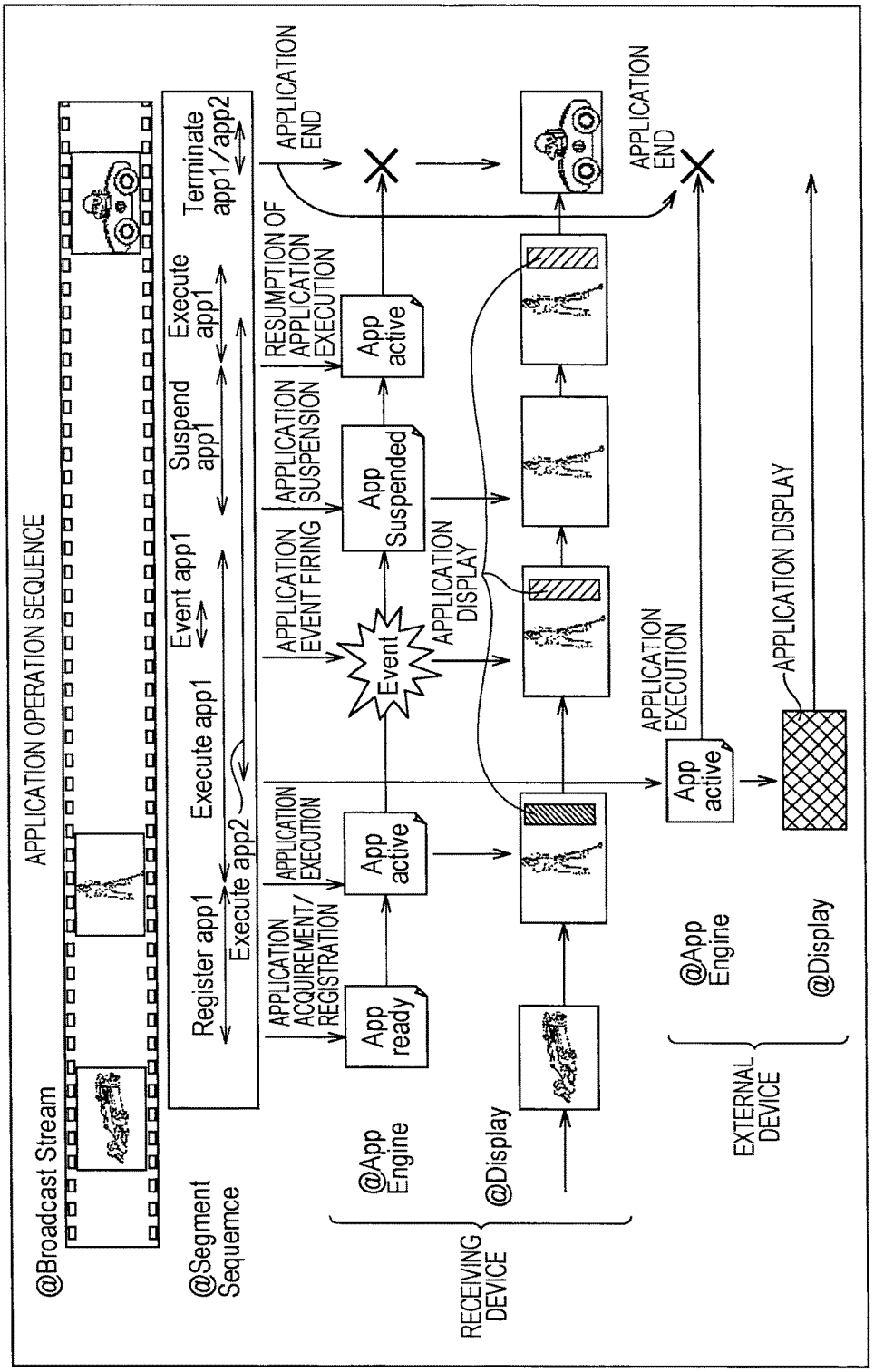
FIG. 33 is a diagram for explaining a third operation scenario for a new information service application.

FIG. 33 shows a third operation scenario for a new information service application. The third operation scenario corresponds to the case where the application control type of the application control descriptor is 3.

Specifically, if a receiving device main unit is designated as the command destination device of the command data contained in segment data in the application control data acquired by the receiving device 30 from the server 22, the receiving device 30 operates in accordance with the command type of the command data. More specifically, the receiving device 30 acquires a new information service application, starts the application, causes the application to fire an event, suspends the application, resumes (restarts) the execution of the application, or ends the application. If the external device 40 is designated as the command destination device of the command data, the receiving device 30 generates a command for the external device 40, and notifies the external device 40 of the command. The external device 40 then acquires the new information service application from the server 22, executes the application, or ends the application.

Figure 34:
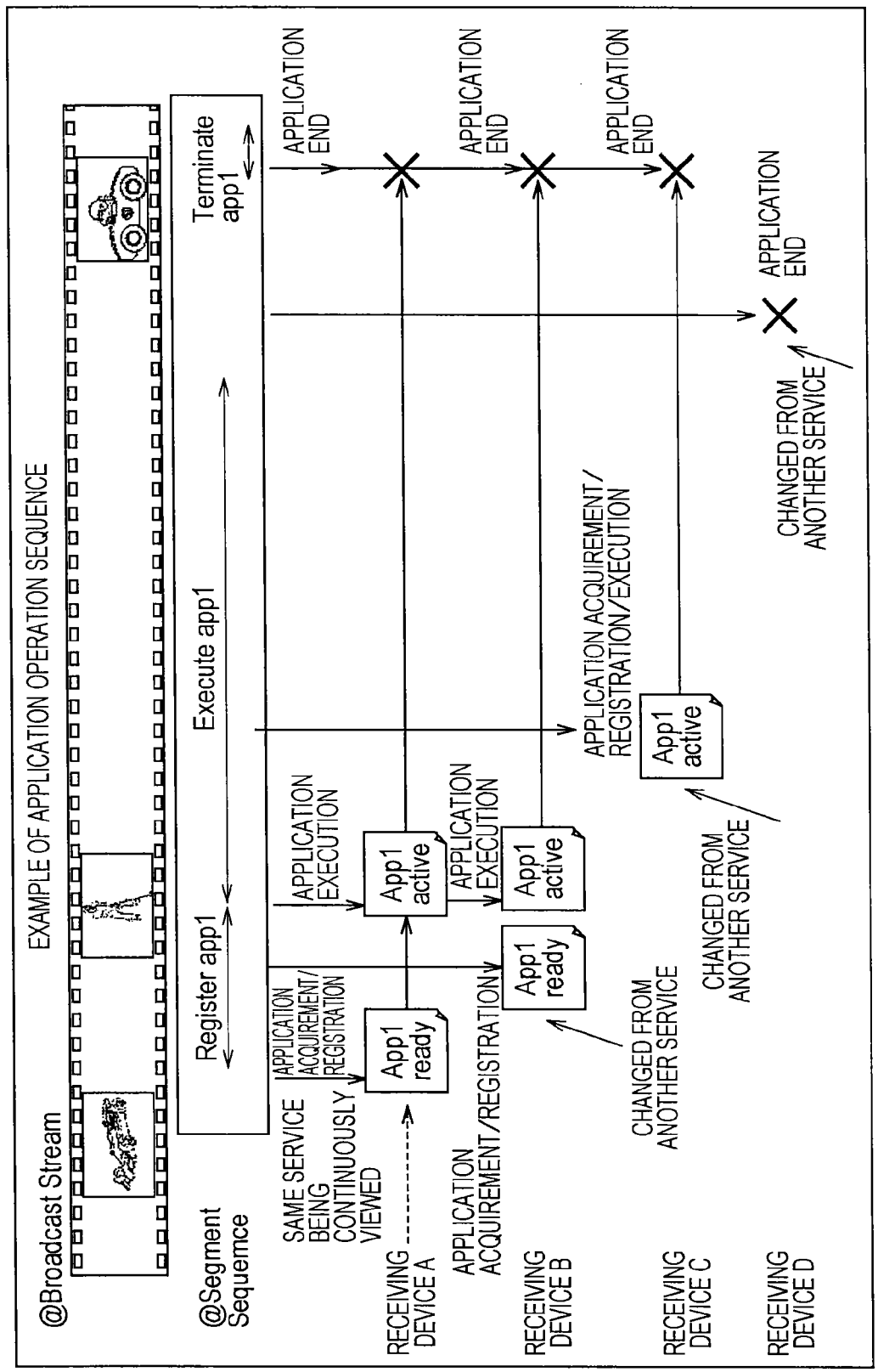
FIG. 34 is a diagram for explaining a fourth operation scenario for a new information service application.

FIG. 34 shows a fourth operation scenario for a new information service application. Like the third operation scenario, the fourth operation scenario corresponds to the case where the application control type of the application control descriptor is 3. The fourth operation scenario shows operations of two or more receiving devices 30.

Specifically, a receiving device A that has been continuously receiving the same service acquires (registers) a new information service application from the server 22, in accordance with a command acquired (registered) at the time indicated by "start_PTS" in a sequence command. A receiving device B that has a service changed from another service to this service acquires (registers) the new information service application from the server 22, in accordance with a command acquired (registered) at the time of the service selection. At the time indicated by "start_PTS" in the sequence command, the receiving devices A and B start (execute) the new information service application in accordance with a start command.

Later than that, a receiving device C that has a service changed from another service to this service acquires (registers) the new information service application from the server 22 and starts (executes) the application, in accordance with a start command at the time of the service selection.

Even later than the receiving device C, a receiving device D changes a service from another service to this service. Since the segment valid period of the segment data containing the start command has already passed, any operation related to the new information service application is not performed.

As described so far, in the broadcasting system 10 of this embodiment, the broadcasting side can control not only the receiving device 30 but also the external device 40 connected to the receiving device 30, in synchronization with progress of a designated type of show or commercial.

The above described series of operations can be performed by hardware, and can also be performed by software. In a case where the series of operations are performed by software, the program of the software is installed into a computer incorporated into special-purpose hardware, or is installed from a program recording medium into a general-purpose personal computer that can execute various kinds of functions through installs of various kinds of programs.

FIG. 35 is a block diagram showing an example structure of the hardware of a computer that performs the above described series of operations in accordance with a program.

In this computer 100, a CPU (Central Processing Unit) 101, a ROM (Read Only Memory) 102, and a RAM (Random Access Memory) 103 are connected to one another by a bus 104.

An input/output interface 105 is further connected to the bus 104. An input unit 106 formed with a keyboard, a mouse, a microphone, and the like, an output unit 107 formed with a display, a speaker, and the like, a storage unit 108 formed with a hard disk, a nonvolatile memory, and the like, a communication unit 109 formed with a network interface and the like, and a drive 110 that drives a removable medium 111 such as a magnetic disk, an optical disk, a magnetooptical disk, or a semiconductor memory are connected to the input/output interface 105.

In the computer having the above described structure, the CPU 101 loads a program stored in the storage unit 108 into the RAM 103 via the input/output interface 105 and the bus 104, and executes the program, so that the above described series of operations are performed.

The program to be executed by the computer may be a program for carrying out operations in chronological order in accordance with the sequence described in this specification, or may be a program for carrying out operations in parallel or whenever necessary such as when there is a call.

The program may be executed by one computer, or may be executed by more than one computer in a distributive manner. Further, the program may be transferred to a remote computer, and be executed therein.

In this specification, a "system" means an entire apparatus formed with more than one device.

It should be noted that embodiments of this disclosure are not limited to the above described embodiment, and various modifications may be made to it without departing from the scope of this disclosure.

REFERENCE SIGNS LIST

2 Broadcasting network, 3 Internet, 10 Broadcasting system, 21 Broadcasting device, 22 Server, 30 Receiving device, 40 External device, 61 Tuner, 62 Multiplexing/separating unit, 63 Audio decoder, 64 Audio output unit, 65 Video decoder, 66 Analyzing (e.g., trigger detecting) unit, 67 Video output unit, 68 Control unit, 69 Memory, 70 Operating unit, 72 Communication I/F, 73 Cache memory, 74 Application engine, 75 Memory, 75A Working memory, 75B Saving memory, 76 External I/F, 81 Reception monitoring unit, 82 Application control descriptor acquiring unit, 83 Application descriptor analyzing unit, 84 Command information detecting unit, 85 Command information analyzing unit, 86 External device command generating unit, 87 Application control data acquiring unit, 88 Segment data sequence holding unit, 89 Segment data analyzing unit, 100 Computer, 101 CPU.

The invention claimed is:

1. A reception apparatus, comprising:
 circuitry configured to
  receive a digital broadcast signal;
  acquire, from the received digital broadcast signal, control information associated with a particular programming segment, the control information including an application identifier, an action identifier, and a destination identifier, the application identifier identifying an application, the action identifier identifying an action associated with the application, and the destination identifier specifying whether the action is to be processed by the reception apparatus or an external device;
  when the destination identifier specifies that the action identified by the action identifier of the control information is to be processed by the external device, deliver the control information to the external device; and
  when the destination identifier specifies that the action identified by the action identifier of the control information is to be processed by the reception apparatus, perform an operation related to the application identified by the application identifier in accordance with the action.

2. The reception apparatus according to claim 1, wherein the destination identifier specifies that the action identified by the action identifier of the control information is to be processed by the reception apparatus and the external device.

3. The receiving device according to claim 1, wherein the control information further identifies a predetermined server location.

4. The reception apparatus according to claim 1, wherein the action is to execute, suspend, or end the application identified by the application identifier.

5. The reception apparatus according to claim 1, wherein the digital broadcast signal includes the control information and A/V content, which includes the particular programming segment, and
the application identified by the application identifier is programmed to cause additional content to be presented in synchronization with the A/V content.

6. The reception apparatus according to claim 1, wherein the circuitry is further configured to acquire the application identified by the application identifier from a server via the Internet.

7. A method of processing control information included in a digital broadcast signal, the method comprising:
receiving, by circuitry of a reception apparatus, the digital broadcast signal;
acquiring, from the received digital broadcast signal, the control information associated with a particular programming segment, the control information including an application identifier, an action identifier, and a destination identifier, the application identifier identifying an application, the action identifier identifying an action associated with the application, and the destination identifier specifying whether the action is to be processed by the reception apparatus or an external device;
when the destination identifier specifies that the action identified by the action identifier of the control information is to be processed by the external device, delivering, by the circuitry, the control information to the external device; and
when the destination identifier specifies that the action identified by the action identifier of the control information is to be processed by the reception apparatus, perform an operation related to the application identified by the application identifier in accordance with the action.

8. The method according to claim 7, further comprising:
when the action identified by the action identifier of the control information is to be processed by the external device, performing, by the external device, an operation related to the application identified by the application identifier in accordance with the action.

9. The method according to claim 7, wherein the action identified by the action identifier of the control information is to be processed by the reception apparatus and the external device.

10. The method according to claim 7, wherein the control information further identifies a predetermined server location.

11. The method according to claim 7, wherein the action is to execute, suspend, or end the application identified by the application identifier.

12. The method according to claim 7, further comprising:
acquiring, by the reception apparatus or the external device, the application identified by the application identifier from a server via the Internet.

13. A non-transitory computer-readable medium storing a program which when executed by a computer causes a reception apparatus to:
receive a digital broadcast signal;
acquire, from the received digital broadcast signal, control information associated with a particular programming segment, the control information including an application identifier, an action identifier, and a destination identifier, the application identifier identifying an application, the action identifier identifying an action associated with the application, and the destination identifier specifying whether the action is to be processed by the reception apparatus or an external device;
when the destination identifier specifies that the action identified by the action identifier of the control information is to be processed by the external device, deliver the control information to the external device; and
when the destination identifier specifies that the action identified by the action identifier of the control information is to be processed by the reception apparatus, perform an operation related to the application identified by the application identifier in accordance with the action.

14. The non-transitory computer-readable medium according to claim 13, wherein the destination identifier specifies that the action identified by the action identifier of the control information is to be processed by the reception apparatus and the external device.

15. The non-transitory computer-readable medium according to claim 13, wherein the control information further identifies a predetermined server location.

16. The non-transitory computer-readable medium according to claim 13, wherein the action is to execute, suspend, or end the application identified by the application identifier.

17. The non-transitory computer-readable medium according to claim 13, wherein the program which when executed by the computer further causes the reception apparatus to acquire the application identified by the application identifier from a server via the Internet.

* * * * *